United States Patent
Koike et al.

(10) Patent No.: US 9,407,553 B2
(45) Date of Patent: Aug. 2, 2016

(54) LINE RELAYING DEVICE, TDM LINE DETOUR SYSTEM, AND TDM LINE DETOUR CONTROL METHOD

(71) Applicants: Tsutomu Koike, Tokyo (JP); Shunichi Kumagai, Tokyo (JP)

(72) Inventors: Tsutomu Koike, Tokyo (JP); Shunichi Kumagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 15 days.

(21) Appl. No.: 14/361,649

(22) PCT Filed: Sep. 27, 2012

(86) PCT No.: PCT/JP2012/006209
§ 371 (c)(1),
(2) Date: May 29, 2014

(87) PCT Pub. No.: WO2013/080411
PCT Pub. Date: Jun. 6, 2013

(65) Prior Publication Data
US 2014/0313896 A1    Oct. 23, 2014

(30) Foreign Application Priority Data
Dec. 2, 2011    (JP) .................................. 2011-264713

(51) Int. Cl.
*H04L 12/803* (2013.01)
*H04J 3/08* (2006.01)
(Continued)

(52) U.S. Cl.
CPC .............. *H04L 47/122* (2013.01); *H04J 3/085* (2013.01); *H04L 12/43* (2013.01);
(Continued)

(58) Field of Classification Search
CPC .............. H04J 14/0245; H04J 14/0249; H04J 14/0283; H04J 14/02; H04J 14/0227; H04J 14/0286; H04J 2203/006; H04J 2203/0082; H04J 2203/0089; H04J 2203/0071; H04J 2203/0042; H04Q 2011/0033; H04Q 11/0071; H04Q 11/0062; H04Q 11/0066
See application file for complete search history.

(56) References Cited

U.S. PATENT DOCUMENTS 6,940,808 B1 *  9/2005  Shields et al. ................. 370/216
2001/0046206 A1 * 11/2001  Chan et al. .................... 370/222
(Continued)

FOREIGN PATENT DOCUMENTS

JP    2003-259471 A    9/2003
JP    2003-333057 A    11/2003
(Continued)

OTHER PUBLICATIONS

International Search Report (ISR) (PCT Form PCT/ISA/210), in PCT/JP2012/006209, dated Oct. 23, 2012.
(Continued)

*Primary Examiner* — Jung-Jen Liu
(74) *Attorney, Agent, or Firm* — McGinn IP Law Group PLLC

(57) ABSTRACT

When a reduction in the transmission speed of the line preset as the TDM line transfer route is detected by a device-connecting line termination unit, a mapping request, to which information indicating the amount of TDM-line bandwidth overflowing from the line and a destination indicating the final line relaying device have been added, is generated by the mapping request processing unit, and transmitted via the other line to another device connected in a ring network in order to map the overflow amount of bandwidth added to the mapping request on each line sequentially from the other device to the line relaying device as the final transfer destination, thereby forming a TDM-line detour route.

13 Claims, 12 Drawing Sheets

(51) Int. Cl.
*H04L 12/24* (2006.01)
*H04L 12/43* (2006.01)
*H04J 3/16* (2006.01)

(52) U.S. Cl.
CPC .......... *H04L 41/0896* (2013.01); *H04J 3/1682* (2013.01); *H04J 2203/0053* (2013.01); *H04J 2203/0069* (2013.01)

(56) References Cited

U.S. PATENT DOCUMENTS

| | | | |
|---|---|---|---|
| 2004/0090974 A1* | 5/2004 | Balakrishnan et al. | 370/412 |
| 2004/0208554 A1* | 10/2004 | Wakai et al. | 398/54 |
| 2005/0002329 A1* | 1/2005 | Luft et al. | 370/222 |
| 2005/0244158 A1* | 11/2005 | Luft | 398/59 |
| 2008/0170496 A1* | 7/2008 | Kano | 370/225 |

FOREIGN PATENT DOCUMENTS

| | | |
|---|---|---|
| JP | 2008-172710 A | 7/2008 |
| RU | 2 230 435 C2 | 6/2004 |
| RU | 2 362 270 C2 | 7/2009 |

OTHER PUBLICATIONS

Extended European Search Report dated Jun. 8, 2015.
Paul Bonenfant, et al.: "Generic Framing Procedure (GFP): The Catalyst of Efficient Data Over Transport", IEEE Communications Magazine, IEEE Service Center, Piscataway, US, vol. 40, No. 5, May 1, 2002, pp. 72-79, XP011092829, ISSN 0163-6804.
Daniel O. Awduche Movaz Networks, et al.: "RSVP-TE: Extensions to RSVP for LSP Tunnels; draft-ietf-mpls-rsvp-1sp-tunne1109.txt", Aug. 1, 2001, vol. mpls, No. 9, pp. 1-64, Aug. 1, 2001, XP015023822, ISSN: 0000-0004.
Russian Decision on Grant dated Jan. 14, 2016 with English translation.

* cited by examiner

LINE RELAYING DEVICE, TDM LINE DETOUR SYSTEM, AND TDM LINE DETOUR CONTROL METHOD

TECHNICAL FIELD

The present invention relates to a line relaying device, a TDM line detour system, and a TDM line detour control method and, particularly, it is suitably applicable to a line relaying device that accommodates a transmission line where the transmission bandwidth varies depending on the surrounding environment in the field of a line relaying device such as an outdoor transmission device (radio relaying device) in a ring-architecture network, thereby enabling TDM (Time Division Multiplexing) line data to detour, so that the data can be transmitted without discard even when the transmission bandwidth varies.

BACKGROUND ART

In a radio relay device that accommodates a radio line as one example of a line relaying device, the transmission speed that is capable of transmission varies, as it is affected by the surrounding environment. In general, when setting up a network, a network architect assumes a throughput for transmission in accordance with the transmission speed designed first and accommodates a TDM (Time Division Multiplexing) line and an Ethernet (registered trademark) line as described in Patent Literature 1: Japanese Unexamined Patent Application Publication No. 2003-259471, "packet/TDM integrated node device". Accordingly, when the transmission speed does not vary, transmission with the throughput assumed by the network architect is possible. However, when the transmission speed varies due to the effect of the surrounding environment and the like, it is assumed that transmission with the throughput of the accommodated TDM line and Ethernet line is not possible at the current transmission speed of a variable-transmission-speed device-connecting line, which results in a failure to provide appropriate services.

When the network topology is the ring architecture, even when the transmission speed in one route of the variable-transmission-speed device-connecting line that is connected to the line relaying device decreases due to the effect of the surrounding environment and the like, the other route is connected to the destination by the ring architecture, and it is possible to achieve transmission through a detour path using the other route.

However, although detour, throughput reduction and the like can be implemented as protocols by flow control or switching in the case of Ethernet packet communication, a fixed bandwidth is required and a transfer route needs to be uniquely determined in advance in the case of TDM communication.

Therefore, in the case where the transmission speed of the variable-transmission-speed device-connecting line that is connected to the line relaying device varies due to the effect of the surrounding environment and the like, when the transmission speed decreases to fall below the transmission bandwidth required for the TDM line as a degree of variation in the transmission speed, there is a problem that it becomes impossible to transmit the TDM line data, and the data is discarded without outputting the TDM line data from the variable-transmission-speed device-connecting line.

Further, even when modification to the radio modulation scheme or the like is made, there is a possibility that a variation in the speed of the variable-transmission-speed device-connecting line occurs, and as a result, it is only possible to transmit the TDM line data which can be transmitted with the transmission bandwidth after the variation among the TDM line data flowing into the line relaying device. Accordingly, there is a problem that, even when the radio modulation scheme is modified, the TDM line data that overflows the transmission bandwidth is not transmitted to the opposite device.

CITATION LIST

Patent Literature

PTL1: Japanese Unexamined Patent Application Publication No. 2003-259471 (pp. 5-8)

SUMMARY OF INVENTION

Technical Problem

The above-described problems in related art are described using a typical ring network as shown in FIG. 4 as an example. FIG. 4 is a network configuration diagram showing a configuration example of a network in which variable-transmission-speed device-connecting lines are connected in a ring, and it is used as an explanatory diagram to describe the exiting data transmission method for the TDM line in the ring network. FIG. 4 shows a configuration example of a ring network in which three line relaying devices 1, 2 and 3 are connected in a ring by variable-transmission-speed device-connecting lines 11, 12 and 13 where the transmission speed varies, such as radio lines.

In FIG. 4, a TDM line is accommodated between a TDM termination device 21 and the line relaying device 1, and an Ethernet line is accommodated between an L2 switch 31 and the line relaying device 1. The line relaying devices 1, 2 and 3 are connected in a ring by the variable-transmission-speed device-connecting lines 11, 12 and 13 as described above. In the Ethernet communication, in order to avoid the occurrence of a loop of the Ethernet communication in the variable-transmission-speed device-connecting lines 11, 12 and 13, connection of the variable-transmission-speed device-connecting line 13, for example, is logically disconnected in normal times using STP protocol (Spanning Tree Protocol).

On the other hand, the TDM communication is made through the TDM termination device 21 connected using the TDM line, the line relaying device 1 that terminates the TDM line, the variable-transmission-speed device-connecting line 11 (variable bandwidth line) connecting the line relaying device 1 and the line relaying device 3, the line relaying device 3 that terminates the TDM line, and a TDM termination device 22 connected using the TDM line, for example, as a uniquely determined transmission route.

Further, the Ethernet line communication is made through the L2 switch 31 connected using the Ethernet line, the line relaying device 1 that terminates the Ethernet line, the variable-transmission-speed device-connecting line 11 connecting the line relaying device 1 and the line relaying device 3, the line relaying device 3 that terminates the Ethernet line, and an L2 switch 33 connected using the Ethernet line.

Likewise, the line relaying device 2 communicates with a L2 switch 32 connected using the Ethernet line and performs Ethernet communication with the other devices through the variable-transmission-speed device-connecting lines 12 and 13 connected with the line relaying devices 1 and 3. Note that, however, the variable-transmission-speed device-connecting line 13 is logically disconnected in normal times by the STP (spanning tree protocol) as described above. Therefore, Ethernet communication data that is transmitted from the line relaying device 2 to the line relaying device 3 is actually transmitted to the line relaying device 3 through a detour route of the variable-transmission-speed device-connecting line 12, the line relaying device 1 and the variable-transmission-speed device-connecting line 11.

Further, in the existing TDM communication, even when the transmission bandwidth of the variable-transmission-speed device-connecting line 11 varies and the transmission bandwidth is reduced, for example, it is necessary to transmit data using the transmission route that has been uniquely determined in advance, without using another detour route. Therefore, when the transmission bandwidth of the variable-transmission-speed device-connecting line 11 is reduced, the line relaying device 1 transmits only the amount of TDM line data, which corresponds to the bandwidth that can be transmitted, to the line relaying device 3, and the amount of TDM line data which overflows the bandwidth that can be transmitted is not transmitted from the line relaying device 1 to the line relaying device 3 and discarded in the line relaying device 1. There is thus a problem that the data to be transmitted is not transmitted from the line relaying device 1 due to the variation of the transmission bandwidth.

(Exemplary Object of the Invention)

The present invention has been accomplished to solve the above problems and an exemplary object of the present invention is thus to provide a line relaying device, a TDM line detour system, and a TDM line detour control method that create a TDM line detour route using a ring architecture according to the variation in the transmission speed and thereby provides a service having redundancy for TDM line data that is otherwise discarded.

Solution to Problem

To solve the above problem, a line relaying device, a TDM line detour system, and a TDM line detour control method according to the invention have the following main characteristic configurations.

(1) A line relaying device according to an exemplary aspect of the invention is a line relaying device for relaying transmission of data through a communication line, the device constituting a ring network where the line relaying device and an opposite device are connected in a ring by a variable-transmission-speed device-connecting line where a transmission speed varies, wherein when detecting reduction of a transmission bandwidth that is capable of transmission caused by variation in a transmission speed of the variable-transmission-speed device-connecting line preset as a TDM line transfer route, the line relaying device creates a TDM line detour route allowing the amount of TDM line transmission bandwidth overflowing from the variable-transmission-speed device-connecting line to transfer by a detour via another line relaying device connected in a ring according to a degree of variation in the transmission speed.

(2) A TDM line detour system according to an exemplary aspect of the invention is a TDM line detour system for setting and canceling a TDM line detour route using a ring network which is configured so that line relaying devices for relaying transmission of data through a communication line are connected in a ring by a variable-transmission-speed device-connecting line where a transmission speed varies, wherein each of the line relaying devices is configured as the line relaying device descried at least in the above (1).

(3) A TDM line detour control method according to an exemplary aspect of the invention is a TDM line detour control method for setting and canceling a TDM line detour route using a ring network which is configured so that line relaying devices for relaying transmission of data through a communication line are connected in a ring by a variable-transmission-speed device-connecting line where a transmission speed varies, wherein when detecting reduction of a transmission bandwidth that is capable of transmission caused by variation in a transmission speed of the variable-transmission-speed device-connecting line preset as a TDM line transfer route, any one of the line relaying devices creates a TDM line detour route allowing the amount of TDM line transmission bandwidth overflowing from the variable-transmission-speed device-connecting line to transfer by a detour via another line relaying device connected in a ring according to a degree of variation in the transmission speed.

Advantageous Effects of Invention

The line relaying device, the TDM line detour system, the TDM line detour control method and the TDM line detour control program according to the invention have the following exemplary advantageous effects.

A first exemplary advantageous effect is that, when the transmission bandwidth of the variable-transmission-speed device-connecting line that connects the line relaying devices varies, a detour route for the overflow amount of TDM line transmission bandwidth can be automatically created using the ring architecture, and it is thus possible to reliably prevent the TDM line data from being discarded and thereby provide a service having redundancy for the TDM transmission bandwidth.

A second exemplary advantageous effect is that, when the transmission bandwidth of the variable-transmission-speed device-connecting line returns to the original state after automatically creating a detour route for the overflow amount of TDM line transmission bandwidth caused by the variation in the transmission bandwidth of the variable-transmission-speed device-connecting line that connects the line relaying devices, the transfer route for the TDM line data is automatically recovered to the previous state, and therefore it is not necessary for a network administrator to optimize the network setting each time the transmission speed of the variable-transmission-speed device-connecting line varies.

DESCRIPTION OF EXEMPLARY EMBODIMENTS

A preferred exemplary embodiment of a line relaying device, a TDM line detour system, a TDM line detour control method, and a TDM line detour control program according to the present invention is described hereinafter with reference to the attached drawings. Note that, although the line relaying device, the TDM line detour system and the TDM line detour control method according to an exemplary embodiment of the present invention are described below, the invention may be implemented as a TDM line detour control program that causes a computer mounted on the line relaying device to execute the TDM line detour control method, or the TDM line detour control program may be stored in a computer-readable recording medium. Further, although the present invention is based on the assumption that the line relaying devices that constitute a network are connected with one another by a variable-transmission-speed device-connecting line where the transmission speed varies depending on the surrounding environment and the like, the variable-transmission-speed device-connecting line may be formed by any type of line, either wired or wireless.

(Features of the Invention)

Prior to describing exemplary embodiments of the present invention, an overview of the features of the invention is given herein below. The present invention provides a scheme that automatically creates/cancels a detour route that allows TDM (Time Division Multiplexing) line data to detour when the transmission speed of a variable-transmission-speed device-connecting line varies in a ring network in which line relaying devices are connected in a ring by variable-transmission-speed device-connecting lines where the transmission speed varies depending on the surrounding environment and the like, and when the bandwidth capable of transmission for the TDM line varies according to the variation in the speed of the variable-transmission-speed device-connecting line, the present invention implements a function of automatically creating a detour route intended by a network architect to secure the transmission bandwidth required for the TDM line and a function of automatically canceling the setting of the created detour route to recover to the original transfer route.

Figure 4:
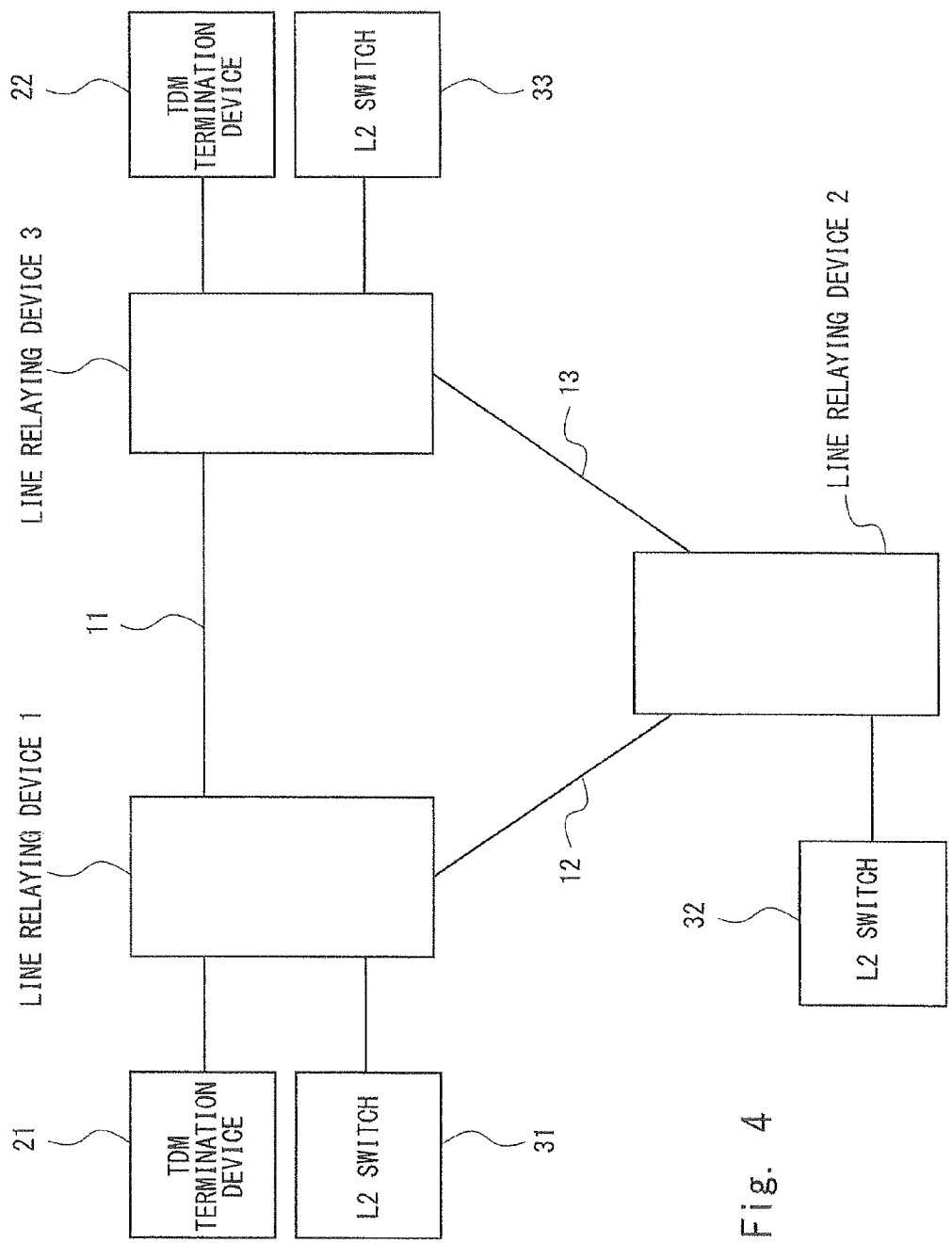
FIG. 4 is a network configuration diagram showing a configuration example of a network where variable-transmission-speed device-connecting lines are connected in a ring.

To be more specific, in the ring architecture network illustrated in FIG. 4, for example, the line relaying device 1 that accommodates the variable-transmission-speed device-connecting lines 11 and 12 pre-stores route selection information as to which of the variable-transmission-speed device-connecting lines 11 and 12 data from the terminated TDM line and data from the Ethernet line is to be transmitted to.

When, in the line relaying device 1, the transmission speed of a line previously selected as a line to transmit TDM line data, which is, for example, the variable-transmission-speed device-connecting line 11, varies and the bandwidth capable of transmission becomes lower than the current TDM line accommodation bandwidth, a detour route that allows the TDM line data overflowing the transmission bandwidth of the variable-transmission-speed device-connecting line 11 where the transmission speed is reduced to detour through the variable-transmission-speed device-connecting line 12, the line relaying device 2 and the variable-transmission-speed device-connecting line 13 is created by utilizing the ring architecture network. As a result, the TDM line data overflowing the variable-transmission-speed device-connecting line 11 is transferred through the detour route, and it is thereby possible to prevent the occurrence of the case where the overflowing data is discarded.

Therefore, the scheme is provided that, even when a variation in the transmission speed of the variable-transmission-speed device-connecting line 11, 12 or 13 occurs, a detour route is automatically constructed and data is reliably transmitted to the opposite device without discarding TDM line data and, when the transmission bandwidth is restored to the original state, the setting of the created detour route is automatically canceled and the original transfer route is recovered.

(Configuration Example of Exemplary Embodiment)

Figure 1:
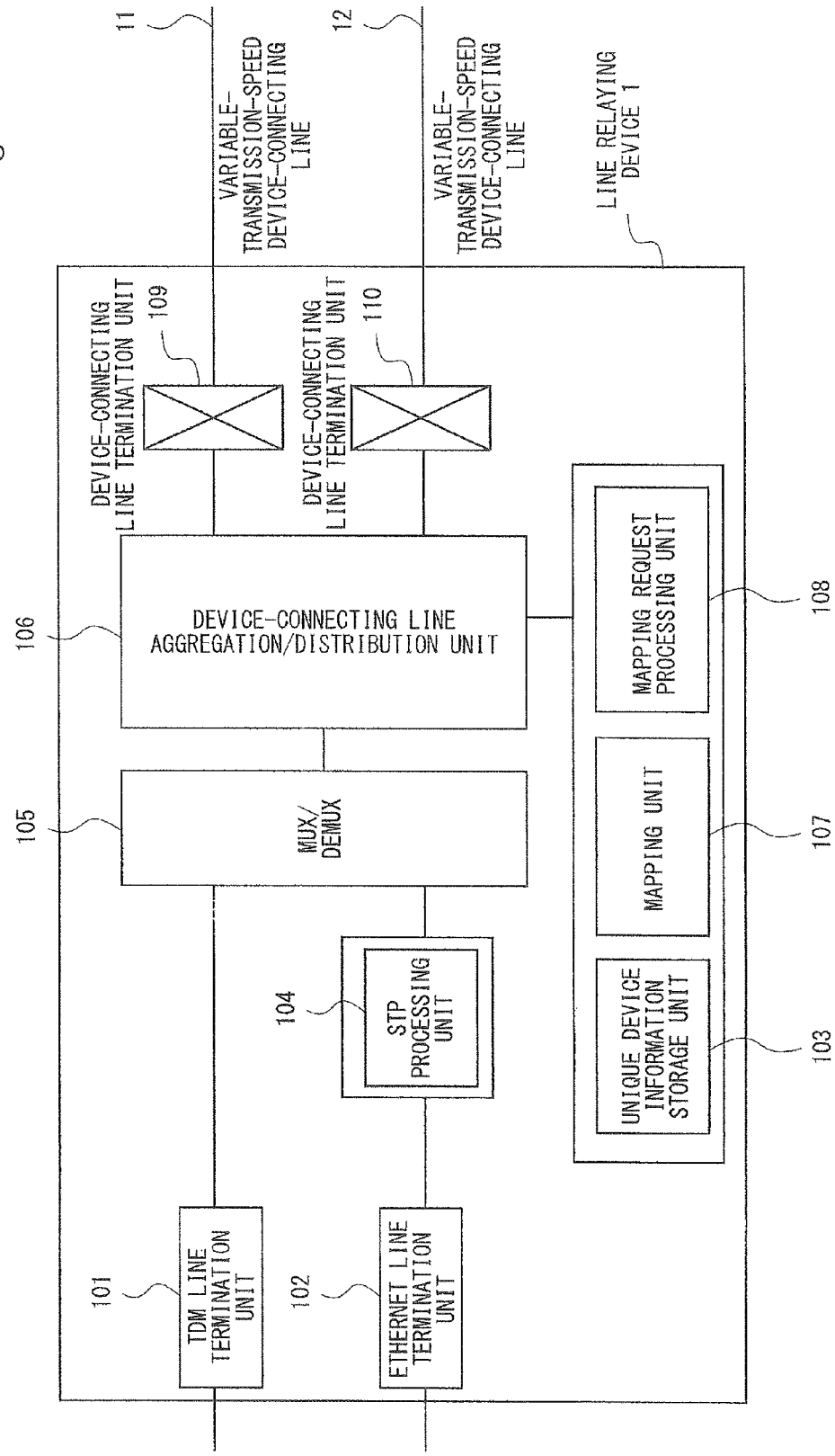
FIG. 1 is a block diagram showing one example of a block configuration of a line relaying device according to an exemplary embodiment of the invention.

A configuration example of a line relaying device according to an exemplary embodiment of the present invention is described hereinafter with reference to the block diagram of FIG. 1. FIG. 1 is a block diagram showing one example of a block configuration of a line relaying device according to an exemplary embodiment of the invention. It is assumed in this invention that each of the line relaying devices 1, 2 and 3 constituting the ring architecture network shown in FIG. 4 is the line relaying device as shown in FIG. 1. In this example, the case is shown where the line relaying device 1 of FIG. 4 corresponds to the line relaying device of FIG. 1, and the line relaying devices 2 and 3 correspond to those shown in FIGS. 2 and 3, respectively, which are described later.

The line relaying device 1 shown in FIG. 1 at least includes a TDM line termination unit 101, an Ethernet line termination unit 102, a unique device information storage unit 103, an STP processing unit 104, a MUX/DEMUX 105 (Multiplexer/Demultiplexer), a device-connecting line aggregation/distribution unit 106, a mapping unit 107, a mapping request processing unit 108, and device-connecting line termination units 109 and 110. The device-connecting line termination units 109 and 110 are parts that respectively terminate the variable-transmission-speed device-connecting lines 11 and 12 that form the ring architecture network in the line relaying device 1 shown in FIG. 4.

The MUX/DEMUX 105 converts TDM data received by the TDM line termination unit 101 and an Ethernet frame received by the Ethernet line termination unit 102 into the format that can be transmitted through the variable-transmission-speed device-connecting lines 11 and 12 and performs data transmission with the opposite devices, which are the line relaying devices 3 and 2, connected to the variable-transmission-speed device-connecting lines 11 and 12. Further, the MUX/DEMUX 105 extracts the TDM data and the Ethernet frame from the transmission format received by the variable-transmission-speed device-connecting lines 11 and 12 and transmits the TDM data to the TDM line termination unit 101 and the Ethernet frame to the Ethernet line termination unit 102 via the STP processing unit 104.

The device-connecting line aggregation/distribution unit 106 aggregates and distributes the data of the two device-connecting line termination units 109 and 110 and determines through which route the data is to be transmitted according to information of a mapping memory that is set to the mapping unit 107.

Further, the device-connecting line termination units 109 and 110 store/compare the current transmission speed information of the variable-transmission-speed device-connecting line 11 and the variable-transmission-speed device-connecting line 12, respectively, and determine that the transmission speed has varied when the current transmission speed has varied from the previous transmission speed and a difference arises between the current transmission speed and the previous transmission speed. In the case where it is determined that the transmission speed has varied, the device-connecting line termination units 109 and 110 transmit a notification about the current transmission speed information after the variation to the mapping unit 107, and the mapping unit 107 makes appropriate mapping settings and updates the mapping memory.

The mapping request processing unit 108 monitors the TDM line capable of transmission based on the information of the mapping memory currently set to the mapping unit 107 and the information of the current transmission speed of the variable-transmission-speed device-connecting lines 11 and 12 stored in the device-connecting line termination units 109 and 110, respectively. When the mapping request processing unit 108 detects that the TDM line data terminated at the line relaying device cannot be entirely accommodated in the transmission format on the variable-transmission-speed device-connecting line 11 of the device-connecting line termination unit where the TDM line is currently mapped, which is, for example, the device-connecting line termination unit 109, due to the variation in the transmission speed, the mapping request processing unit 108 transmits a mapping request requesting detour of the TDM line data to the opposite device connected to the variable-transmission-speed device-connecting line 12, which is, for example, the line relaying device 2, using the variable-transmission-speed device-connecting line 12 of the other device-connecting line termination unit, which is the device-connecting line termination unit 110, for example, as a detour route.

The opposite device that has received the mapping request, which is, for example, the line relaying device 2, checks the mapping of its own device with the information of the mapping memory in the mapping unit based on the received mapping request. When, as a result of the checking, it is determined that it is possible to accommodate the TDM line to detour and transfer the TDM line data through a detour route, the device transmits a notification of mapping permission indicating that mapping as a detour route is possible to the other device from which the mapping request has been made, which is, for example, the line relaying device 1, and, at the same time, makes a mapping request to the other opposite device to which the final detour route is set as the final destination, which is, for example, the line relaying device 3. On the other hand, when it is determined that it is not possible to accommodate the TDM line to detour and transfer the TDM line data through a detour route, the device transmits a notification that mapping is not possible to the other device from which the mapping request has been made, which is, for example, the line relaying device 1, or just leaves it timeout without performing an operation to transmit a notification of mapping permission and thereby makes the device aware that mapping is not possible.

Note that, at the time when the network is constructed, the unique device information storage unit 103 stores unique device information, e.g., a MAC address or the like, for uniquely distinguishing the line relaying devices 2 and 3 that constitute the network including the line relaying device 1 from the other devices. When transmitting a mapping request from the line relaying device, which is, for example, the line relaying device 1, to the line relaying device 2 that is the opposite device connected to the variable-transmission-speed device-connecting line 12, unique device information, e.g., a MAC address or the like, for uniquely specifying the line relaying device to serve as the final destination, which is, for example, the line relaying device 3, is extracted from the unique device information storage unit 103, added to the mapping request and transmitted to the line relaying device 2 that is the opposite device. Further, when receiving the mapping request, whether the destination address added to the mapping request (information indicating the line relaying device to serve as the final destination of transmission) indicates its own device or not is determined by referring to the unique device information of its own device that is stored in the unique device information storage unit 103.

(Description of Operation of Exemplary Embodiment)

An example of connections of the line relaying device 1 shown in FIG. 1 is described firstly using the case of the ring architecture network shown in FIG. 4 as an example. Specifically, each of the line relaying device 1, the line relaying device 2 and the line relaying device 3 shown in FIG. 4 has the same block configuration as the line relaying device 1 shown in FIG. 1 and includes interfaces that accommodate the variable-transmission-speed device-connecting lines, the TDM line and the Ethernet line. Further, each of the line relaying device 1, the line relaying device 2 and the line relaying device 3 accommodates two variable-transmission-speed device-connecting lines, which are a pair of the variable-transmission-speed device-connecting lines 11 and 12, a pair of the variable-transmission-speed device-connecting lines 12 and 13, and a pair of the variable-transmission-speed device-connecting lines 13 and 11, respectively, and the ring architecture is formed by the variable-transmission-speed device-connecting lines 11, 12 and 13.

In the ring network of FIG. 4, the line relaying device 1 is connected with the TDM termination device 21 by the TDM line, and the line relaying device 3 is connected with the TDM termination device 22 by the TDM line also. The line relaying device 1 and the line relaying device 3 are connected by the variable-transmission-speed device-connecting line 11, and TDM communication is performed between the TDM termination device 21 and the TDM termination device 22.

Further, the line relaying device 1, the line relaying device 2 and the line relaying device 3 are respectively connected with the L2 switches 31, 32 and 33 by the Ethernet line and perform Ethernet communication.

Note that, because the ring architecture is employed in the network configuration example of FIG. 4, in order to avoid the occurrence of a loop in the Ethernet communication, the variable-transmission-speed device-connecting line 13, for example, is logically disconnected in Ethernet communication in normal times using STP protocol. However, the variable-transmission-speed device-connecting line 13 is connected as a physical line, and data transfer is possible for TDM communication and other protocol communications different from Ethernet communication.

The details of the operation in the case where the line relaying device having the same configuration as in FIG. 1 is applied to each of the line relaying devices 1, 2 and 3 in the ring architecture network of FIG. 4, which is the scheme of detour control of the TDM line, are described hereinafter as one example.

In the network of FIG. 4, when the transmission speed of the variable-transmission-speed device-connecting line 11 varies, and the transmission bandwidth of the variable-transmission-speed device-connecting line 11 becomes smaller than the transmission bandwidth capable of transmitting the whole TDM line accommodated between the TDM termination device 21 and the line relaying device 1, the device-connecting line termination unit 109 of the line relaying device 1 in FIG. 1 transmits a notification about the detection of the variation in the transmission speed of the variable-transmission-speed device-connecting line 11 and a notification about new speed information after the variation to the mapping request processing unit 108.

Receiving the notifications, the mapping request processing unit 108 determines whether the current transmission speed of the variable-transmission-speed device-connecting line 11 in FIG. 4 can transmit the whole data of the accommodated TDM line based on the new speed information after the variation and the information of the mapping memory in the mapping unit 107.

When it is determined that the whole data cannot be transmitted, in order to create a detour route for the overflow bandwidth amount of TDM line data, the mapping request processing unit 108 transmits a request for checking whether creation of a detour route through the variable-transmission-speed device-connecting line 13 is possible, which is a mapping request requesting creation of a detour route, together with information indicating information about the overflow amount of TDM line bandwidth, to the other device connected to the variable-transmission-speed device-connecting line 12, which is the line relaying device 2 in FIG. 4.

Figure 2:
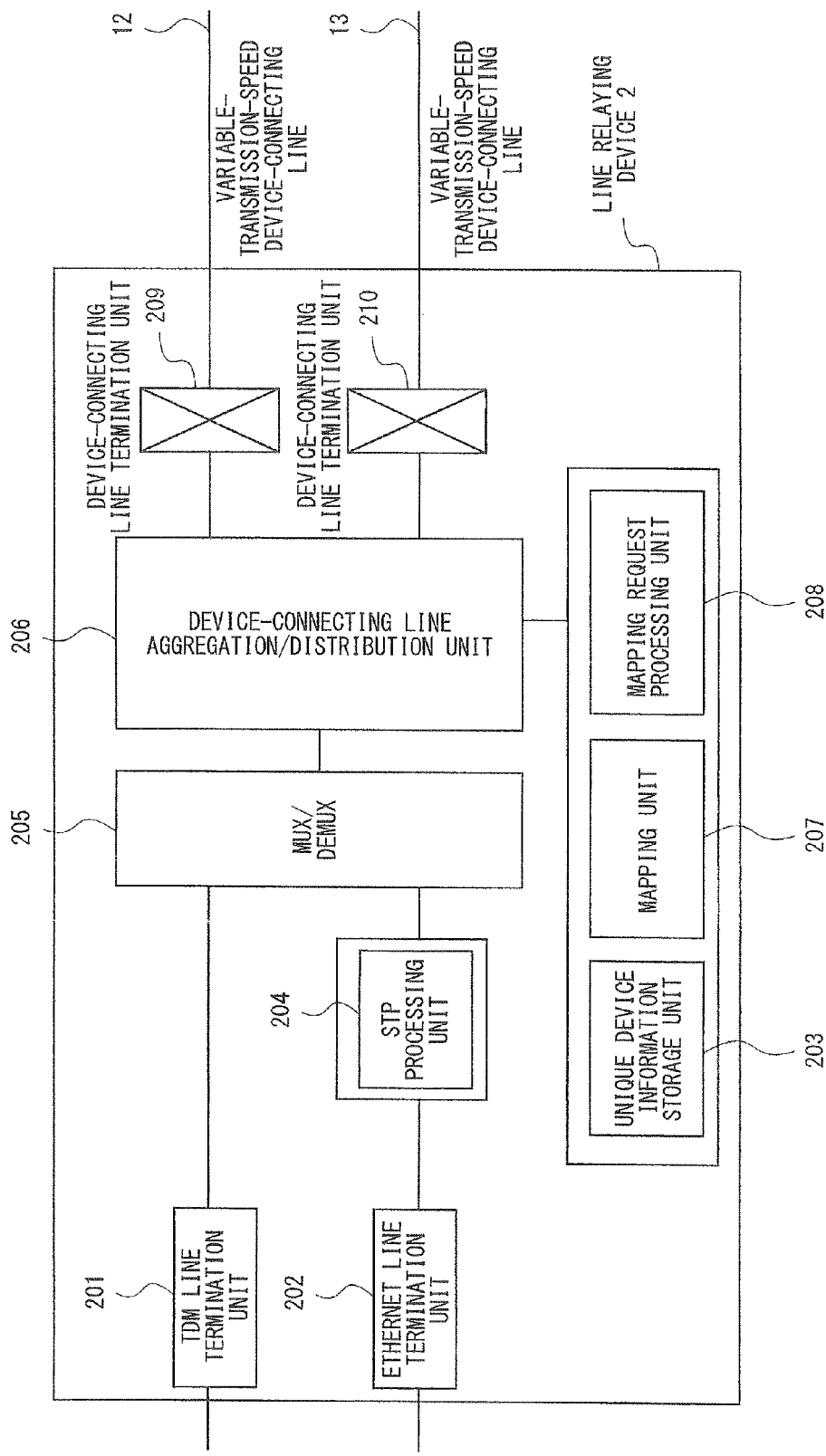
FIG. 2 is a block diagram showing a block configuration of a line relaying device 2 in a network of FIG. 4.

The line relaying device 2 that has received the request for checking, i.e., the mapping request, has the same configuration as the line relaying device 1 in FIG. 1 except that the reference symbols are different, as shown in the device configuration of FIG. 2. FIG. 2 is a block diagram showing the block configuration of the line relaying device 2 in the network of FIG. 4, and it at least includes a TDM line termination unit 201, an Ethernet line termination unit 202, a unique device information storage unit 203, an STP processing unit 204, a MUX/DEMUX 205, a device-connecting line aggregation/distribution unit 206, a mapping unit 207, a mapping request processing unit 208, and device-connecting line termination units 209 and 210, like the line relaying device in FIG. 1. The device-connecting line termination units 209 and 210 are parts that respectively terminate the variable-transmission-speed device-connecting lines 12 and 13 that form the ring architecture network.

The line relaying device 2 transfers the request for checking, i.e., the mapping request, received from the line relaying device 1 by the device-connecting line termination unit 209 to the mapping request processing unit 208 for processing in the mapping request processing unit 208. The mapping request processing unit 208 determines whether it is possible to secure the transmission bandwidth for the TDM line requested by the mapping request from the line relaying device 1 based on information about the mapping memory in the mapping unit 207 and information about the transmission speed of the variable-transmission-speed device-connecting line 13 to serve as a detour route.

When the mapping request processing unit 208 determines that it is possible to secure the transmission bandwidth for the TDM line requested by the mapping request, the mapping request processing unit 208 transmits a notification that the mapping request can be met by the variable-transmission-speed device-connecting line 12 serving as a detour route to the line relaying device 1 from which the mapping request has been made and further transmits a similar mapping request (a request for checking whether creation of a detour route through the variable-transmission-speed device-connecting line 13 is possible, which is a mapping request requesting creation of a detour route) to the line relaying device 3 as the other end of communication connected to the variable-transmission-speed device-connecting line 13 as the final destination of the mapping request.

Figure 3:
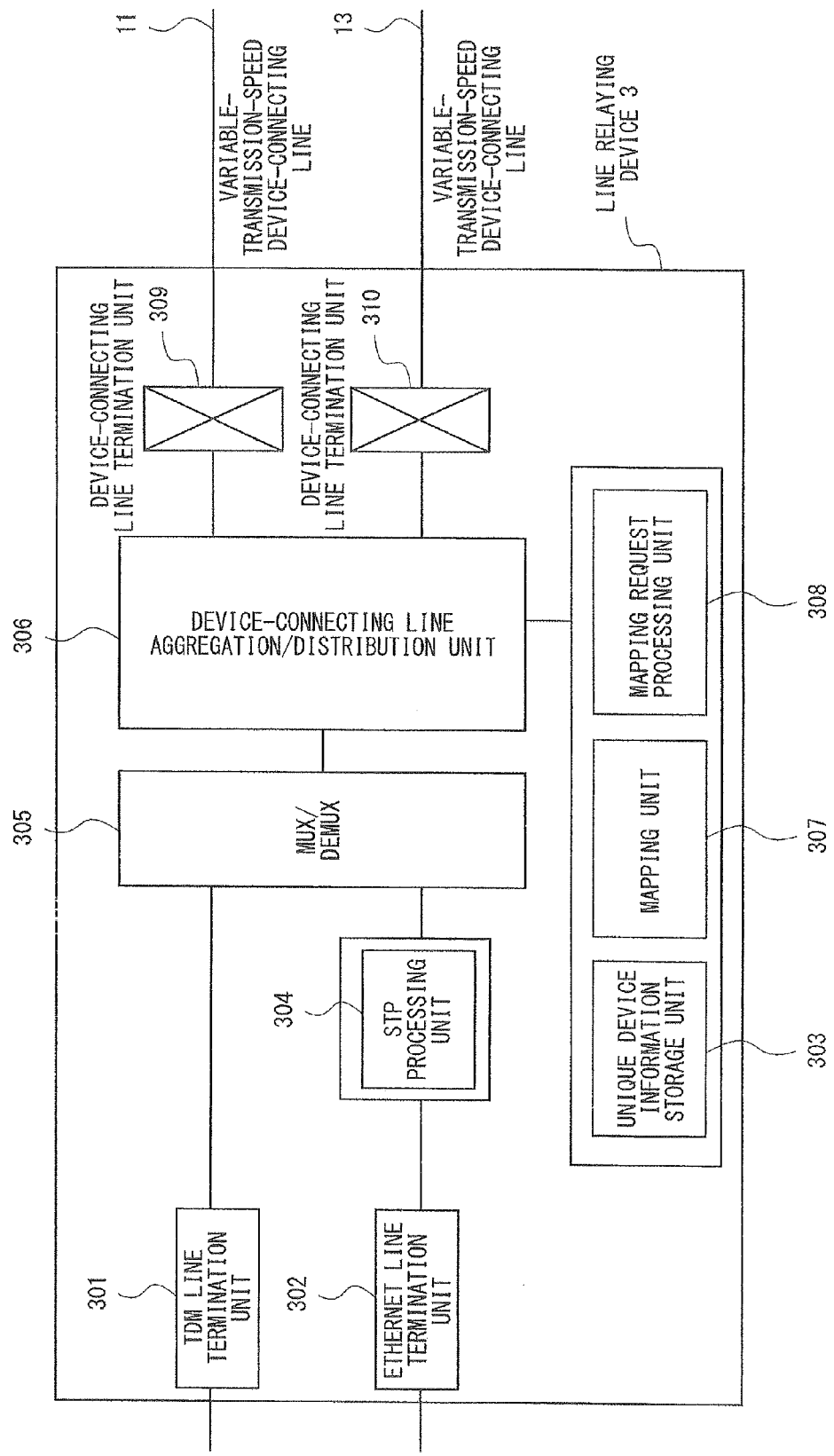
FIG. 3 is a block diagram showing a block configuration of a line relaying device 3 in the network of FIG. 4.

The line relaying device 3 that has received the request for checking, i.e., the mapping request, has the same configuration as the line relaying device 1 in FIG. 1 except that the reference symbols are different, as shown in the device configuration of FIG. 3. FIG. 3 is a block diagram showing the block configuration of the line relaying device 3 in the network of FIG. 4, and it at least includes a TDM line termination unit 301, an Ethernet line termination unit 302, a unique device information storage unit 303, an STP processing unit 304, a MUX/DEMUX 305, a device-connecting line aggregation/distribution unit 306, a mapping unit 307, a mapping request processing unit 308, and device-connecting line termination units 309 and 310, like the line relaying device in FIG. 1. The device-connecting line termination units 309 and 310 are parts that respectively terminate the variable-transmission-speed device-connecting lines 11 and 13 that form the ring architecture network.

When the requested transmission bandwidth for the TDM line is secured both between the line relaying device 1 and the line relaying device 2 and between the line relaying device 2 and the line relaying device 3, a detour route that transfers the data corresponding to the amount of TDM transmission bandwidth reduced in the line preset as the transfer route (TDM path) for TDM line data, which is the variable-transmission-speed device-connecting line 11 connecting the line relaying device 1 to the line relaying device 3, to the line relaying device 3 through the variable-transmission-speed device-connecting lines 12 and 13 is formed.

Figure 5:
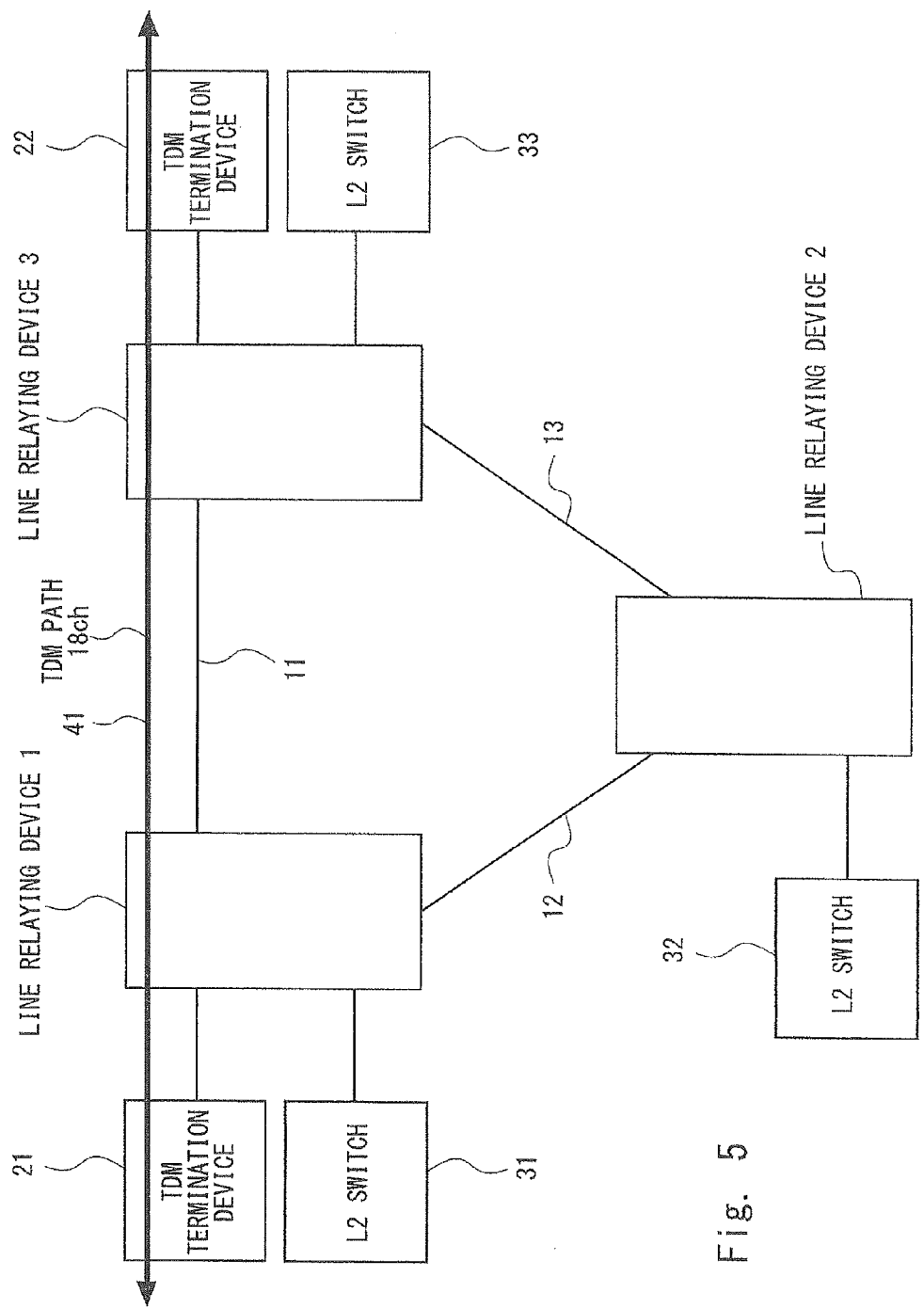
FIG. 5 is an explanatory view to describe a route to transfer TDM data before reduction of the transmission bandwidth of a variable-transmission-speed device-connecting line (variable-transmission-speed device-connecting line 11) that is set in advance as a data transfer route of a TDM line in the network of FIG. 4

FIG. 5 is an explanatory view to describe a route to transfer TDM data before reduction of the transmission bandwidth of the variable-transmission-speed device-connecting line (variable-transmission-speed device-connecting line 11) preset as a TDM line data transfer route in the network of FIG. 4, and it illustrates that the variable-transmission-speed device-connecting line 11 is a transfer route 41 for TDM data in the case where the transmission bandwidth capable of transmitting the whole 16ch TDM line is secured as the TDM path with a heavy line.

Figure 6:
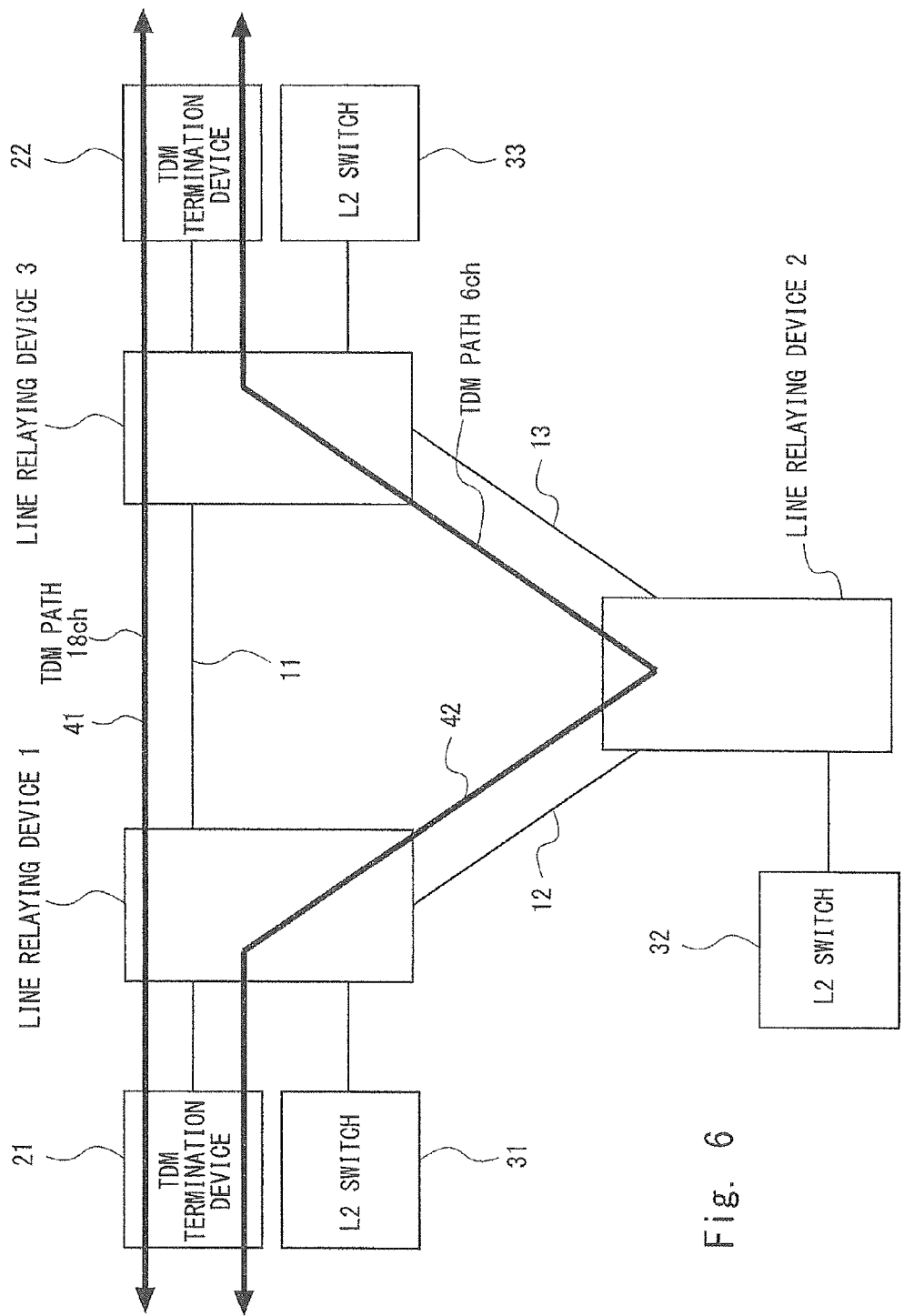
FIG. 6 is an explanatory view to describe a route to transfer TDM data after reduction of the transmission bandwidth of a variable-transmission-speed device-connecting line (variable-transmission-speed device-connecting line 11) that is preset as a data transfer route for a TDM line in the network of FIG. 4.

FIG. 6 is an explanatory view to describe a route to transfer TDM data after reduction of the transmission bandwidth of a variable-transmission-speed device-connecting line (variable-transmission-speed device-connecting line 11) preset as a TDM line data transfer route in the network of FIG. 4, and it illustrates an example in the case where the transmission bandwidth of the variable-transmission-speed device-connecting line 11 varies, and the transmission bandwidth of the variable-transmission-speed device-connecting line 11 preset as a transfer route 41 (TDM path) for TDM line data decreases by 6ch and is reduced to the transmission bandwidth of 10ch as the transfer route 41 (TDM path) for the TDM data. By performing the detour control processing as described above, a detour route through the line relaying device 1, the variable-transmission-speed device-connecting line 12, the line relaying device 2, the variable-transmission-speed device-connecting line 13 and the line relaying device 3 is created as the detour transfer route 42 for TDM data, and the 6ch TDM data overflowing the transfer route 41 is transmitted to the line relaying device 3 through the line relaying device 2.

Figure 7:
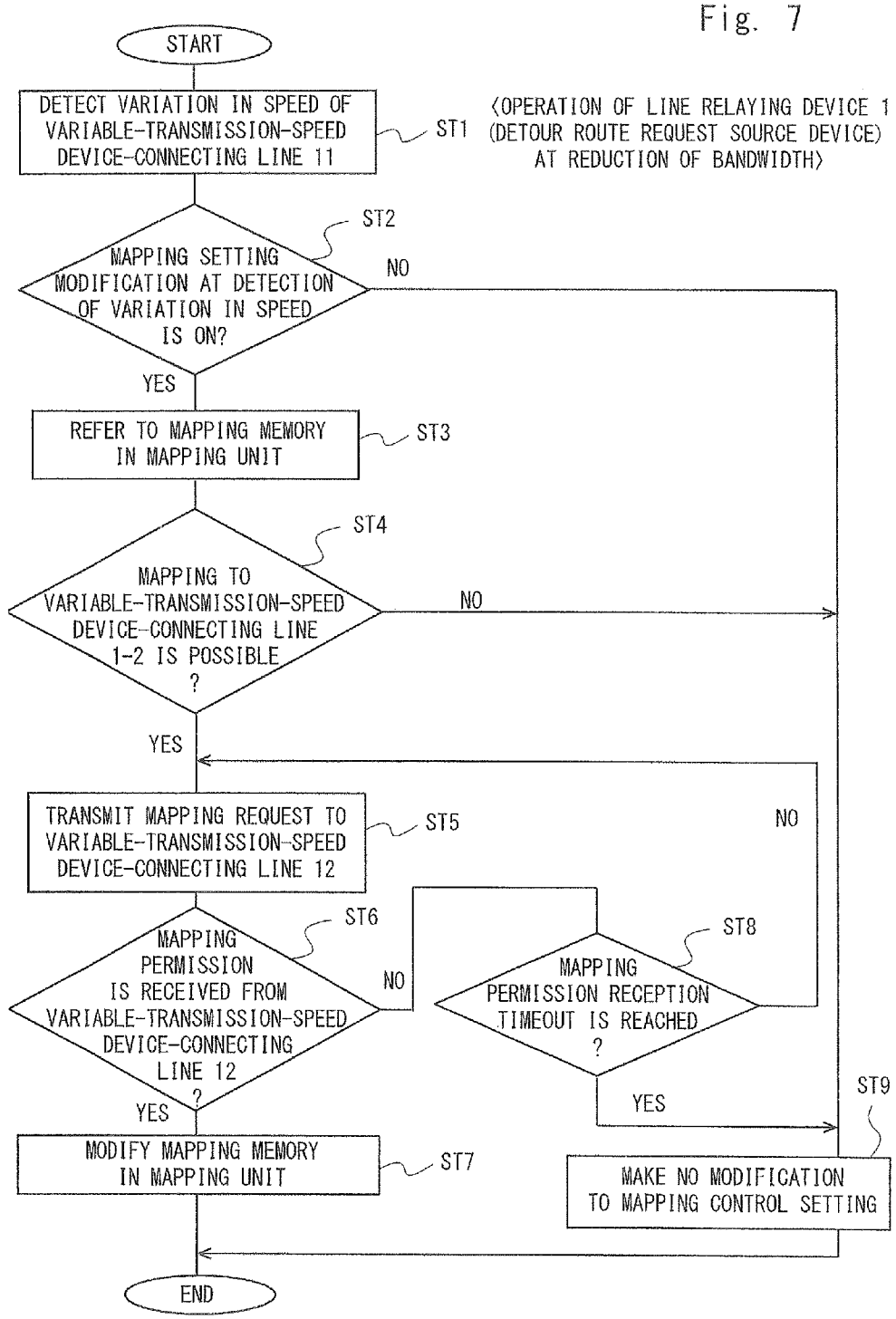
FIG. 7 is a flowchart to describe the flow of operation of a detour route request source device (line relaying device 1) at the time of detour control related to a TDM line in the network of FIG. 4.

The flow of detour control of the TDM data as described above is further described using the flowchart of FIG. 7. FIG. 7 is a flowchart to describe the flow of operation of a detour route request source device (the line relaying device 1) at the time of detour control related to the TDM line in the network of FIG. 4, and it illustrates the flow of the detour operation that causes the TDM line data transfer route to detour in the line relaying device 1 using the case where the transmission bandwidth of the variable-transmission-speed device-connecting line 11 decreases and the transmission bandwidth for the TDM line is no longer secured as an example. In other words, it shows one example of the detour setting operation in the line relaying device 1 which serves as a detour route request source device for TDM line data.

In the flowchart of FIG. 7, when the line relaying device 1 detects that the transmission speed of the variable-transmission-speed device-connecting line 11 varies at the device-connecting line termination unit 109 shown in FIG. 1 and becomes lower than the previous speed (Step ST1), a notification indicating this is given to the mapping request processing unit 108, and the mapping request processing unit 108 first determines whether a function of modifying mapping (mapping setting modification flag) is enabled (ON) or disabled (OFF) when the variation in the transmission speed of the variable-transmission-speed device-connecting line is detected (Step ST2).

When the function of modifying mapping is disabled (NO in Step ST2), the process proceeds to Step ST9, and the detour control process ends without performing mapping control setting modification processing that makes a mapping modification for changing the transfer route (Step ST9).

On the other hand, when the function of modifying mapping is enabled (YES in Step ST2), the process proceeds to Step ST3, and the mapping state of the variable-transmission-speed device-connecting lines 11 and 12 connected to the line relaying device 1 is checked by reference to information of the mapping memory in the mapping unit 107 (Step ST3).

After this, on the basis of the result of checking the mapping state of the variable-transmission-speed device-connecting lines 11 and 12, it is checked whether it is possible to map the TDM line transmission bandwidth due to a decrease in the transmission speed of the variable-transmission-speed device-connecting line 11 to the variable-transmission-speed device-connecting line 12 (Step ST4). In other words, it is checked whether the amount of TDM line transmission bandwidth overflowing due to a decrease in the transmission speed of the variable-transmission-speed device-connecting line 11 can detour through the variable-transmission-speed device-connecting line 12.

When it is determined that it is not possible to map the TDM line transmission bandwidth to the variable-transmission-speed device-connecting line 12 (NO in Step ST4), the process proceeds to Step ST9, and the detour control process ends without performing mapping control setting modification processing (Step ST9).

On the other hand, when it is determined that it is possible to map the TDM line transmission bandwidth to the variable-transmission-speed device-connecting line 12 (YES in Step ST4), the process proceeds to Step ST5, and a mapping request to which information of the address indicating the line relaying device 3, which is the final destination of TDM line data, and information indicating the amount of TDM line transmission bandwidth overflowing from the variable-transmission-speed device-connecting line 11 are added is transmitted to the line relaying device 2 which is the opposite device connected to the variable-transmission-speed device-connecting line 12 through the variable-transmission-speed device-connecting line 12 (Step ST5).

The line relaying device 2 which is the opposite device to which the mapping request has been transmitted performs processing related to the mapping request from the line relaying device 1 and determines whether the mapping request can be met, and if it can be met, transmits mapping permission information to the line relaying device 1 from which the mapping request has been made through the variable-transmission-speed device-connecting line 12.

The line relaying device 1 from which the mapping request has been made determines whether the mapping permission information that is transmitted back from the line relaying device 2 which is the opposite device to which the request has been made through the variable-transmission-speed device-connecting line 12 is received (Step ST6). When the mapping permission information to be transmitted back from the line relaying device 2 which is the opposite device to which the request has been made is not yet received (NO in Step ST6), it is determined whether a predetermined timeout period has elapsed after transmitting the mapping request and thereby finds whether the mapping permission information reception timeout is reached (Step ST8). The timeout period is a period of time that is determined arbitrarily according to the transmission speed and the environment.

When the timeout period has not elapsed after transmitting the mapping request and the reception timeout is not reached (NO in Step ST8), the process returns to Step ST5 and repeats the operation of transmitting the mapping request to the line relaying device 2 which is the opposite device through the variable-transmission-speed device-connecting line 12. On the other hand, when the timeout period has elapsed after transmitting the mapping request and the reception timeout is reached (YES in Step ST8), it is considered that the line relaying device 2 is not ready to carry out the mapping for the detour route, and the process proceeds to Step ST9, and the detour control process ends without performing mapping control setting modification processing (Step ST9).

On the other hand, in Step ST6, when the mapping permission information to be transmitted back from the line relaying device 2 which is the opposite device to which the request has been made is received (YES in Step ST6), both the line relaying device 1 and the line relaying device 2 can map of the amount of TDM line transmission bandwidth overflowing due to a decrease in the transmission speed of the variable-transmission-speed device-connecting line 11 to the variable-transmission-speed device-connecting line 12, and therefore the information of the mapping memory in the mapping unit 107 is modified so that the amount of TDM line transmission bandwidth reduced in the variable-transmission-speed device-connecting line 11 is newly mapped into the variable-transmission-speed device-connecting line 12 (Step ST7). As a result, as shown in FIG. 6, the amount of TDM line transmission bandwidth overflow from the variable-transmission-speed device-connecting line 11 that is preset as the transfer route 41 for the TDM line data is transferred to the line relaying device 2 through a detour route of the variable-transmission-speed device-connecting line 12 that is set as a detour transfer route 42.

Hereinafter, as described in FIG. 7, an example of the flow of the detour recovery control operation in the line relaying device 1 at the time of bandwidth recovery in the case where it returns from the state of performing control for mapping the amount of TDM line transmission bandwidth overflowing due to a decrease in the transmission bandwidth of the variable-transmission-speed device-connecting line 11 into the variable-transmission-speed device-connecting line 12 to the state of being able to map the whole of the TDM line transmission bandwidth into the transmission bandwidth of the variable-transmission-speed device-connecting line 11 by the recovery of the transmission bandwidth of the variable-transmission-speed device-connecting line 11 is described in detail with reference to the flowchart of FIG. 8.

Figure 8:
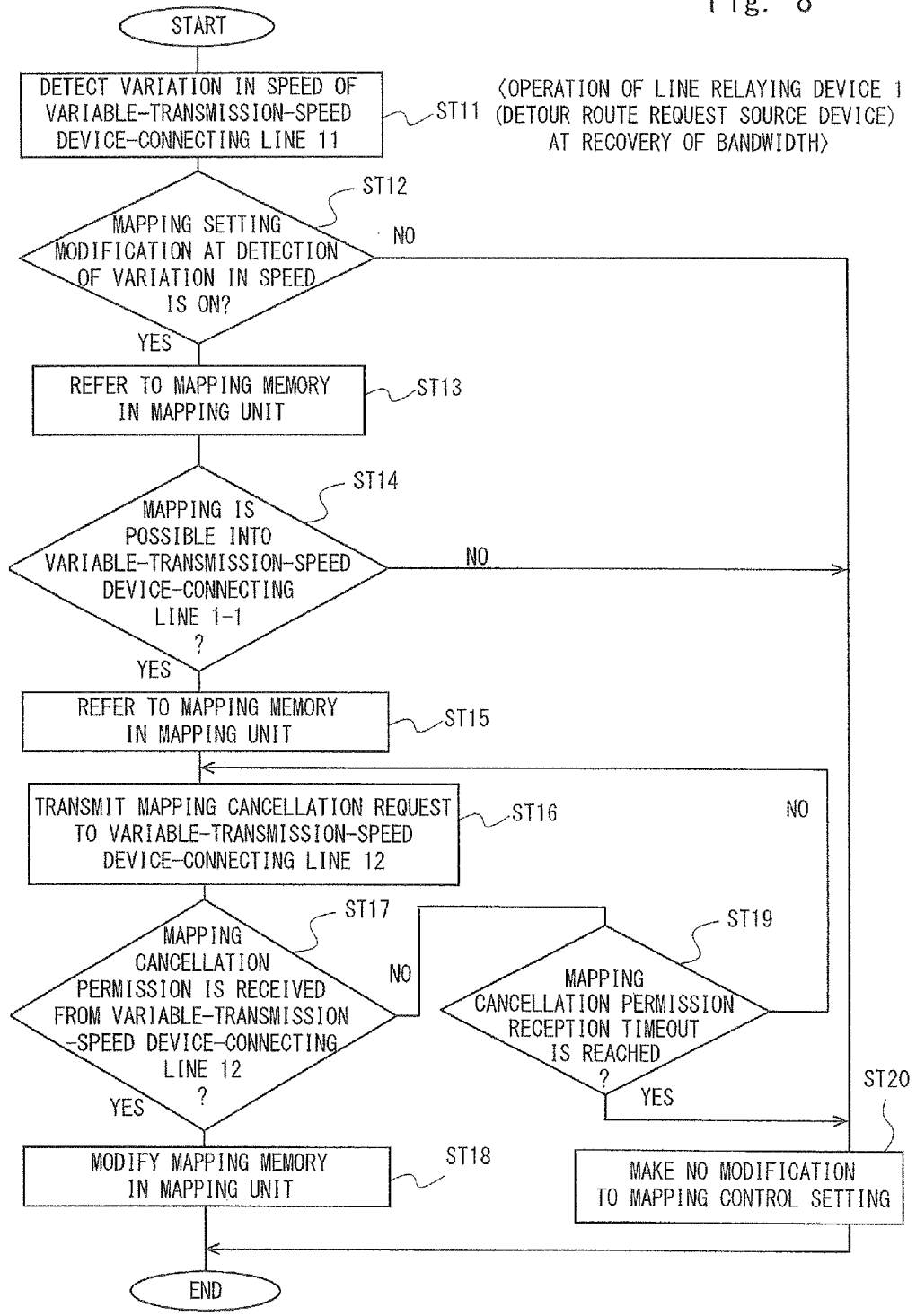
FIG. 8 is a flowchart to describe the flow of operation of a detour route request source device (line relaying device 1) at the time of detour recovery control related to a TDM line in the network of FIG. 4.

FIG. 8 is a flowchart to describe the flow of operation of a detour route request source device (the line relaying device 1) at the time of detour recovery control related to the TDM line in the network of FIG. 4, and it illustrates the flow of recovery of TDM line data from a detour route to a normal transfer route in the line relaying device 1, using the case where the transmission bandwidth of the variable-transmission-speed device-connecting line 11 that has been reduced recovers to the previous bandwidth and becomes ready to secure the whole TDM line transmission bandwidth as an example. In other words, it shows an example of the detour recovery operation in the line relaying device 1 that has been a detour route request source device for TDM line data.

In the flowchart of FIG. 8, when the line relaying device 1 detects that the transmission speed of the variable-transmission-speed device-connecting line 11 varies in the device-connecting line termination unit 109 shown in FIG. 1 and becomes higher than the previous speed (Step ST11), a notification indicating this is transmitted to the mapping request processing unit 108, and the mapping request processing unit 108 first determines whether a function of modifying mapping (mapping setting modification flag) is enabled (ON) or disabled (OFF) when the variation in the transmission speed of the variable-transmission-speed device-connecting line is detected (Step ST12).

When the function of modifying mapping is disabled (NO in Step ST12), the process proceeds to Step ST20, and the detour control process ends without performing mapping control setting modification processing that makes a mapping modification for changing the transfer route (Step ST20).

On the other hand, when the function of modifying mapping is enabled (YES in Step ST12), the process proceeds to Step ST13, and the mapping state of the variable-transmission-speed device-connecting lines 11 and 12 connected to the line relaying device 1 is checked by reference to information of the mapping memory in the mapping unit 107 (Step ST13).

After this, on the basis of the result of checking the mapping state of the variable-transmission-speed device-connecting lines 11 and 12, it is checked whether it is possible to map the TDM line transmission bandwidth that has been mapped to the variable-transmission-speed device-connecting line 12 back to the variable-transmission-speed device-connecting line 11 because of an increase in the transmission speed of the variable-transmission-speed device-connecting line 11 (Step ST14). In other words, it is checked whether the amount of TDM line transmission bandwidth that has been detoured through the variable-transmission-speed device-connecting line 12 can be placed back and transferred through the variable-transmission-speed device-connecting line 11 again because of an increase in the transmission speed of the variable-transmission-speed device-connecting line 11.

When it is determined that it is not possible to map the TDM line transmission bandwidth that has been mapped to the variable-transmission-speed device-connecting line 12 back to the variable-transmission-speed device-connecting line 11 (NO Step ST14), the process proceeds to Step ST20, and the detour control process ends without performing mapping control setting modification processing (Step ST20).

On the other hand, when it is determined that it is possible to map the TDM line transmission bandwidth that has been mapped to the variable-transmission-speed device-connecting line 12 back to the variable-transmission-speed device-connecting line 12 (YES Step ST14), the process proceeds to Step ST15, and the information of the mapping memory in the mapping unit 107 is modified so that the amount of TDM line transmission bandwidth that has been mapped to the variable-transmission-speed device-connecting line 12 recovers to the original state and is mapped back to the variable-transmission-speed device-connecting line 11 (Step ST15).

After this, the process proceeds to Step ST16, and a mapping cancellation request to which information of the address indicating the line relaying device 3, which is the final destination of TDM line data, and information indicating the amount of TDM line transmission bandwidth that has been transferred by a detour are added is transmitted to the line relaying device 2 which is the opposite device connected to the variable-transmission-speed device-connecting line 12 that has been set as a TDM line detour route through the variable-transmission-speed device-connecting line 12 (Step ST16).

The line relaying device 2 which is the opposite device to which the mapping cancellation request has been transmitted performs processing related to the mapping cancellation request from the line relaying device 1 and determines whether the mapping cancellation request can be met, and if it can be met, transmits mapping cancellation permission information to the line relaying device 1 from which the mapping cancellation request has been made through the variable-transmission-speed device-connecting line 12.

The line relaying device 1 from which the mapping cancellation request has been made determines whether the mapping cancellation permission information that is transmitted back from the line relaying device 2 which is the opposite device to which the request has been made through the variable-transmission-speed device-connecting line 12 is received (Step ST17). When the mapping cancellation permission information to be transmitted back from the line relaying device 2 which is the opposite device to which the request has been made is not yet received (NO in Step ST17), it is determined whether a predetermined timeout period has elapsed after transmitting the mapping cancellation request and thereby finds whether the mapping cancellation permission information reception timeout is reached (Step ST19). The timeout period is a period of time that is determined arbitrarily according to the transmission speed and the environment.

When the timeout period has not elapsed after transmitting the mapping cancellation request and the reception timeout is not reached (NO in Step ST19), the process returns to Step ST16 and repeats the operation of transmitting the mapping cancellation request to the line relaying device 2 which is the opposite device through the variable-transmission-speed device-connecting line 12. On the other hand, when the timeout period has elapsed after transmitting the mapping cancellation request and the reception timeout is reached (YES in Step ST19), it is considered that the line relaying device 2 is not ready to cancel the mapping state that has been set for the detour route, and the process proceeds to Step ST20, and the detour control process ends without performing mapping control setting modification processing (Step ST20). Note that, in this case, the state of the mapping memory in the mapping unit 107 may return to the state at the time of detour route setting, and detour control to the line relaying device 2 may be continuously made in the line relaying device 1 as well.

On the other hand, when the mapping cancellation permission information transmitted back from the line relaying device 2 which is the opposite device to which the request has been made is received in Step ST17 (YES in Step ST17), both the line relaying device 1 and the line relaying device 2 are ready to cancel the mapping related to the detour transfer route that has been used for detour transfer, which are ready to recover to the original state where the amount of TDM line transmission bandwidth that has been mapped to the variable-transmission-speed device-connecting line 12 can be mapped back to the variable-transmission-speed device-connecting line 11 because of an increase in the transmission speed of the variable-transmission-speed device-connecting line 11.

Accordingly, the information of the mapping memory in the mapping unit 107 is modified so that the amount of TDM line transmission bandwidth that has been transferred to the variable-transmission-speed device-connecting line 12 is mapped back to the variable-transmission-speed device-connecting line 11 to recover to the mapping state before the detour route is created, which is the original mapping state before the transmission speed of the variable-transmission-speed device-connecting line 11 is reduced (Step ST18). As a result, in the line relaying device 1, the setting of the detour transfer route 42 for the TDM line as shown in FIG. 6 is cancelled, and it returns to the state where the TDM line data is transferred only through the transfer route 41 of the variable-transmission-speed device-connecting line 11 shown in FIG. 5 that is preset as a TDM line transfer route.

Hereinafter, an example of the flow of the detour route setting operation in the line relaying device 2 which is the opposite device when a mapping request is transmitted from the line relaying device 1 to the line relaying device 2 which is the opposite device connected to the variable-transmission-speed device-connecting line 12 in order to perform mapping control for mapping the amount of TDM line transmission bandwidth overflowing due to a decrease in the transmission bandwidth of the variable-transmission-speed device-connecting line 11 into the variable-transmission-speed device-connecting line 12 as illustrated in FIG. 7 is described in detail with reference to the flowchart of FIG. 9.

Figure 9:
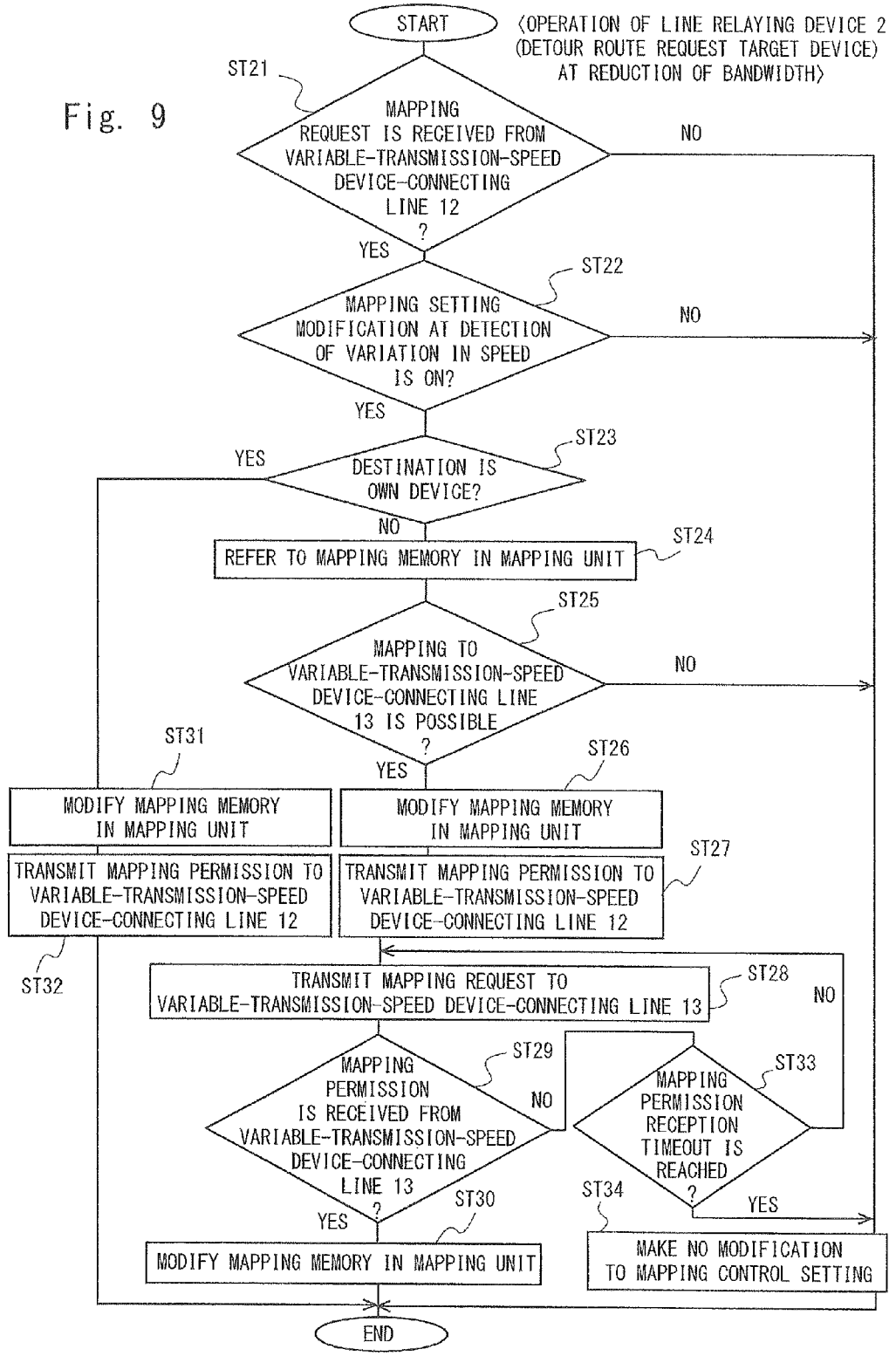
FIG. 9 is a flowchart to describe the flow of operation of a detour route request target device (line relaying device 2) at the time of detour control related to a TDM line in the network of FIG. 4.

FIG. 9 is a flowchart to describe the flow of operation of a detour route request target device (the line relaying device 2) at the time of detour control related to the TDM line in the network of FIG. 4, and it illustrates the flow when creating a detour route for the TDM line data in the line relaying device 2 which is the opposite device that has received the mapping request from the line relaying device 1, using the case where the transmission bandwidth of the variable-transmission-speed device-connecting line 11 decreases and it becomes impossible to secure the whole TDM line transmission bandwidth as an example. In other words, it shows one example of the detour setting operation in the line relaying device 2 that receives the mapping request from the line relaying device 1 as a potential detour destination for the data of the TDM line accommodated in the line relaying device 1 (which is the line relaying device to which the mapping request is transmitted, other than the line relaying device 3 (a detour route request final destination device) that accommodates the TDM line as the final destination of the data of the TDM line accommodated in the line relaying device 1).

In the flowchart of FIG. 9, the line relaying device 2 determines whether reception of the mapping request from the line relaying device 1 through the variable-transmission-speed device-connecting line 12 is detected in the device-connecting line termination unit 209 shown in FIG. 2 (Step ST21). When reception of the mapping request from the line relaying device 1 is not detected (NO in Step ST21), the process proceeds to Step ST34, and the detour control process ends without performing mapping control setting modification processing that makes a mapping modification for changing the transfer route (Step ST34).

On the other hand, when reception of the mapping request from the line relaying device 1 is detected (YES in Step ST21), a notification indicating this is transmitted to the mapping request processing unit 208, and the mapping request processing unit 208 first determines whether a function of modifying mapping (mapping setting modification flag) is enabled (ON) or disabled (OFF) when the variation in the transmission speed of the variable-transmission-speed device-connecting line is detected (Step ST22).

When the function of modifying mapping is disabled (NO in Step ST22), the process proceeds to Step ST34, and the detour control process ends without performing mapping control setting modification processing (Step ST34).

On the other hand, when the function of modifying mapping is enabled (YES in Step ST22), the process proceeds to Step ST23, and it is checked whether the final destination address that is added to the received mapping request from the line relaying device 1 is the line relaying device 2, which is its own device, by referring to unique device information of its own device that is stored in the unique device information storage unit 203 (Step ST23).

When the destination of the mapping request received from the line relaying device 1 is its own device (YES in Step ST23), the process proceeds to Step ST31, and the mapping state of the variable-transmission-speed device-connecting line 12 connected to the line relaying device 2 is checked by reference to information of the mapping memory in the mapping unit 207, and the information of the mapping memory in the mapping unit 207 is modified so that the amount of TDM line transmission bandwidth added to the received mapping request is newly mapped and secured in the variable-transmission-speed device-connecting line 12 (Step ST31). After this, the mapping permission information indicating that the requested mapping is done is transmitted back to the line relaying device 1 from which the mapping request has been made through the variable-transmission-speed device-connecting line 12 (Step ST32), and the detour control process ends.

When the destination of the mapping request is its own device, the mapping request processing unit 208 of the line relaying device 2 ends the process without performing any processing related to detour control for the variable-transmission-speed device-connecting line 13 connected to the other device-connecting line termination unit 210 (the line to which the line relaying device 3 is connected as the opposite device). This is because it is not necessary to further transfer the mapping request from the line relaying device 1 since the address indicating the final destination of the mapping request from the line relaying device 1 indicates the line relaying device 2 of its own. Note that information about the address added to the mapping request may be any information as long as each line relaying device can uniquely distinguish its own device from other devices when the network is constructed, and a MAC address may be used, for example, as described above.

Further, when it is determined in Step ST23 that the destination of the received mapping request from the line relaying device 1 is not its own device (NO in Step ST23), the process proceeds to Step ST24, and the mapping state of the other variable-transmission-speed device-connecting line 13 connected to the line relaying device 2 is checked by reference to information of the mapping memory in the mapping unit 207 (Step ST24).

After this, it is determined whether the TDM line transmission bandwidth requested by the mapping request from the line relaying device 1 can be mapped to the variable-transmission-speed device-connecting line 13 as a detour route based on the result of checking the mapping state of the variable-transmission-speed device-connecting line 13 (Step ST25). In other words, it is checked whether the amount of TDM line transmission bandwidth overflowing due to a decrease in the transmission speed of the variable-transmission-speed device-connecting line 11 can detour along the variable-transmission-speed device-connecting line 13 through the variable-transmission-speed device-connecting line 12.

When it is determined that it is not possible to map the TDM line transmission bandwidth requested by the mapping request from the line relaying device 1 to the variable-transmission-speed device-connecting line 13 (NO in Step ST25), the process proceeds to Step ST34, and the detour control process ends without performing mapping control setting modification processing (Step ST34).

On the other hand, when it is determined that it is possible to map the TDM line transmission bandwidth to the variable-transmission-speed device-connecting line 13 (YES in Step ST25), because mapping of the amount of the TDM line transmission bandwidth requested by the mapping request from the line relaying device 1, which is the amount of TDM line transmission bandwidth overflowing due to a decrease in the transmission speed of the variable-transmission-speed device-connecting line 11, to the variable-transmission-speed device-connecting line 12 is possible as a detour route, the information of the mapping memory in the mapping unit 107 is modified so that the amount of the TDM line transmission bandwidth requested by the mapping request from the line relaying device 1 is newly mapped into the variable-transmission-speed device-connecting line 12 (Step ST26).

After this, the mapping permission information indicating that the requested mapping is done is transmitted back to the line relaying device 1 from which the mapping request has been made through the variable-transmission-speed device-connecting line 12 (Step ST27). As a result, the detour route from the line relaying device 1 to the line relaying device 2 in the detour transfer route 42 shown in FIG. 6 is created.

Further, the mapping request processing unit 208 of the line relaying device 2 transmits a mapping request, to which information indicating the amount of TDM line transmission bandwidth added to the mapping request from the line relaying device 1 (i.e., the amount of TDM line transmission bandwidth overflow from the variable-transmission-speed device-connecting line 11) is added, to the line relaying device 3 that is designated as the final destination of the mapping request from the line relaying device 1 through the variable-transmission-speed device-connecting line 13 (Step ST28).

The line relaying device 3 which is the opposite device to which the mapping request from the line relaying device 2 has been transmitted performs processing related to the mapping request from the line relaying device 2 and determines whether the mapping request can be met, and if it can be met, transmits mapping permission information to the line relaying device 2 from which the mapping request has been made through the variable-transmission-speed device-connecting line 13.

The line relaying device 2 from which the mapping request has been made determines whether the mapping permission information that is transmitted back from the line relaying device 3 which is the opposite device to which the request has been made through the variable-transmission-speed device-connecting line 13 is received (Step ST29). When the mapping permission information to be transmitted back from the line relaying device 3 which is the opposite device to which the request has been made is not yet received (NO in Step ST29), it is determined whether a predetermined timeout period has elapsed after transmitting the mapping request and thereby finds whether the mapping permission information reception timeout is reached (Step ST33). The timeout period is a period of time that is determined arbitrarily according to the transmission speed and the environment.

When the timeout period has not elapsed after transmitting the mapping request and the reception timeout is not reached (NO in Step ST33), the process returns to Step ST28 and repeats the operation of transmitting the mapping request to the line relaying device 3 which is the opposite device through the variable-transmission-speed device-connecting line 13. On the other hand, when the timeout period has elapsed after transmitting the mapping request and the reception timeout is reached (YES in Step ST33), it is considered that the line relaying device 3 is not ready to carry out the mapping for the detour route, and the process proceeds to Step ST34, and the detour control process ends without performing mapping control setting modification processing (Step ST34). Note that, in this case, the state of the mapping memory in the mapping unit 207 may be restored to the state before the modification in Step ST26 to set to the state where detour control cannot be made in the line relaying device 2 as well, and a notification that detour control becomes impossible may be transmitted to the line relaying device 1.

On the other hand, in Step ST29, when the mapping permission information transmitted back from the line relaying device 3 which is being the opposite device to which the request has been made is received (YES in Step ST29), both the line relaying device 2 and the line relaying device 3 can map the amount of TDM line transmission bandwidth requested by the mapping request (i.e., the amount of TDM line transmission bandwidth overflowing due to a decrease in the transmission speed of the variable-transmission-speed device-connecting line 11) to the variable-transmission-speed device-connecting line 13, and therefore the information of the mapping memory in the mapping unit 207 is modified so that the amount of TDM line transmission bandwidth requested by the mapping request (i.e., the amount of TDM line transmission bandwidth overflowing due to a decrease in the transmission speed of the variable-transmission-speed device-connecting line 11) is newly mapped into the variable-transmission-speed device-connecting line 13 (Step ST30). As a result, as shown in FIG. 6, the amount of TDM line transmission bandwidth overflow from the variable-transmission-speed device-connecting line 11 that is preset as the transfer route 41 for the TDM line data is transferred to the line relaying device 3 through a detour route of the variable-transmission-speed device-connecting line 12, the line relaying device 2 and the variable-transmission-speed device-connecting line 13 that is set as a detour transfer route 42.

Hereinafter, as described in FIG. 9, an example of the flow of the detour recovery control operation in the line relaying device 2 when a mapping cancellation request indicating cancellation of setting of the detour route is received from the line relaying device 1 as a result of it returning from the state of performing control for mapping the amount of TDM line transmission bandwidth requested by the mapping request from the line relaying device 1 (which is the amount of TDM line transmission bandwidth overflowing due to a decrease in the transmission speed of the variable-transmission-speed device-connecting line 11) into the variable-transmission-speed device-connecting lines 12 and 13 to the state of being able to map the whole of the TDM line transmission bandwidth into the transmission bandwidth of the variable-transmission-speed device-connecting line 11 by the recovery of the transmission bandwidth of the variable-transmission-speed device-connecting line 11 is described in detail with reference to the flowchart of FIG. 10.

Figure 10:
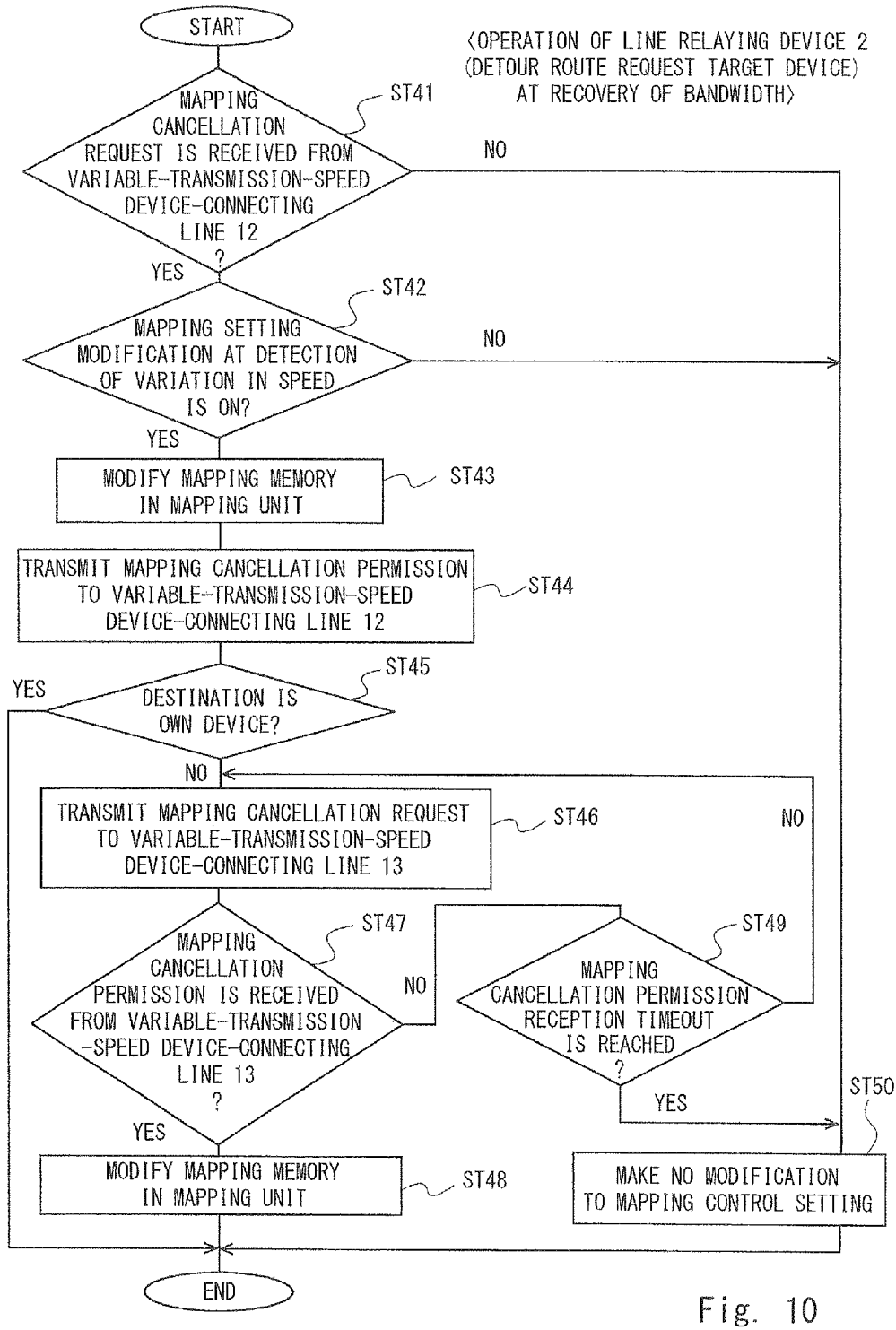
FIG. 10 is a flowchart to describe the flow of operation of a detour route request target device (line relaying device 2) at the time of detour recovery control related to a TDM line in the network of FIG. 4.

FIG. 10 is a flowchart to describe the flow of operation of a detour route request target device (the line relaying device 2) at the time of detour recovery control related to the TDM line in the network of FIG. 4, and it illustrates the flow of canceling the setting of the detour route for TDM line data and recovering to the normal state in the line relaying device 2 when receiving a mapping cancellation request from the line relaying device 1, using the case where the transmission bandwidth of the variable-transmission-speed device-connecting line 11 that has been reduced recovers to the previous bandwidth and becomes ready to secure the whole TDM line transmission bandwidth as an example. In other words, it shows an example of detour recovery operation in the line relaying device 2 that has been a detour route request target device for TDM line data.

In the flowchart of FIG. 10, the line relaying device 2 determines whether reception of the mapping cancellation request from the line relaying device 1 through the variable-transmission-speed device-connecting line 12 is detected in the device-connecting line termination unit 209 shown in FIG. 2 (Step ST41). When reception of the mapping cancellation request from the line relaying device 1 is not detected (NO in Step ST41), the process proceeds to Step ST50, and the detour control process ends without performing mapping control setting modification processing that makes mapping modification for changing the transfer route (Step ST50).

On the other hand, when reception of the mapping cancellation request from the line relaying device 1 is detected (YES in Step ST41), a notification indicating this is transmitted to the mapping request processing unit 208, and the mapping request processing unit 208 first determines whether a function of modifying mapping (mapping setting modification flag) is enabled (ON) or disabled (OFF) when the variation in the transmission speed of the variable-transmission-speed device-connecting line is detected (Step ST42).

When the function of modifying mapping is disabled (NO in Step ST42), the process proceeds to Step ST50, and the detour control process ends without performing mapping control setting modification processing (Step ST50).

On the other hand, when the function of modifying mapping is enabled (YES in Step ST42), the process proceeds to Step ST43, and the information of the mapping memory in the mapping unit 207 is modified for re-mapping so as to cancel the setting of the detour route and recover the amount of TDM line transmission bandwidth that has been mapped to the variable-transmission-speed device-connecting line 12 to the original state (Step ST43).

After this, mapping cancellation permission information indicating that the requested mapping cancellation is done is transmitted to the line relaying device 1 from which the mapping cancellation request has been made through the variable-transmission-speed device-connecting line 12 (Step ST44). As a result, the detour route from the line relaying device 1 to the line relaying device 2 is cancelled among the detour transfer route 42 shown in FIG. 6.

Further, the mapping request processing unit 208 of the line relaying device 2 checks whether the final destination address that is added to the received mapping cancellation request from the line relaying device 1 is the line relaying device 2 of its own by referring to the unique device information of its own device stored in the unique device information storage unit 203 (Step ST45).

When the destination of the mapping cancellation request from the line relaying device 1 is its own device (YES in Step ST45), the detour control process ends because the address indicating the final destination address of the mapping cancellation request from the line relaying device 1 indicates the line relaying device 2 of its own and therefore it is not necessary to further transfer the mapping cancellation request from the line relaying device 1 to the variable-transmission-speed device-connecting line 13 connected to the other device-connecting line termination unit 210 (the line to which the line relaying device 3 is connected as the opposite device). Note that information about the destination address added to the mapping request may be any information as long as each line relaying device can uniquely distinguish its own device from other devices when the network is constructed, and a MAC address may be used, for example, as described above.

On the other hand, when it is determined that the destination of the received mapping cancellation request from the line relaying device 1 is not its own device (NO in Step ST45), the mapping request processing unit 208 of the line relaying device 2 transmits the mapping cancellation request, to which information indicating the amount of TDM line transmission bandwidth added to the mapping cancellation request from the line relaying device 1 (which is the amount of TDM line transmission bandwidth overflow from the variable-transmission-speed device-connecting line 11) is added, to the line relaying device 3 that is designated as the final destination of the mapping cancellation request from the line relaying device 1 through the variable-transmission-speed device-connecting line 13 (Step ST46).

The line relaying device 3 which is the opposite device to which the mapping cancellation request has been transmitted from the line relaying device 2 performs processing related to the mapping cancellation request from the line relaying device 2 and determines whether the mapping cancellation request can be met, and if it can be met, transmits mapping cancellation permission information to the line relaying device 2 from which the mapping cancellation request has been made through the variable-transmission-speed device-connecting line 13.

The line relaying device 2 from which the mapping cancellation request has been made determines whether the mapping cancellation permission information that is transmitted back from the line relaying device 3 which is the opposite device to which the request has been made through the variable-transmission-speed device-connecting line 13 is received (Step ST47). When the mapping cancellation permission information to be transmitted back from the line relaying device 3 which is the opposite device to which the request has been made is not yet received (NO in Step ST47), it is determined whether a predetermined timeout period has elapsed after transmitting the mapping cancellation request and thereby finds whether the mapping cancellation permission information reception timeout is reached (Step ST49). The timeout period is a period of time that is determined arbitrarily according to the transmission speed and the environment.

When the timeout period has not elapsed after transmitting the mapping cancellation request and the reception timeout is not reached (NO in Step ST49), the process returns to Step ST46 and repeats the operation of transmitting the mapping cancellation request to the line relaying device 3 which is the opposite device through the variable-transmission-speed device-connecting line 13. On the other hand, when the timeout period has elapsed after transmitting the mapping cancellation request and the reception timeout is reached (YES in Step ST49), it is considered that the line relaying device 3 is not ready to cancel the mapping state that has been set for the detour route, and the process proceeds to Step ST50, and the detour control process ends without performing mapping control setting modification processing (Step ST50). Note that, in this case, the state of the mapping memory in the mapping unit 207 may return to the state at the time of detour route setting, and a notification indicating not to cancel the setting of the detour route may be transmitted to the line relaying device 1, so that detour control from the line relaying device 1 to the line relaying device 3 is continuously made in the line relaying device 2 as well.

On the other hand, when the mapping cancellation permission information transmitted back from the line relaying device 3 which is the opposite device to which the request has been made is received in Step ST47 (YES in Step ST47), both of the line relaying device 2 and the line relaying device 3 are ready to cancel the mapping related to the detour transfer route that has been used, which are ready to recover to the original state where the amount of TDM line transmission bandwidth that has been mapped to the variable-transmission-speed device-connecting line 13 by the mapping request from the line relaying device 1 can be mapped back to the variable-transmission-speed device-connecting line 11.

Accordingly, the information of the mapping memory in the mapping unit 207 is modified for re-mapping so as to cancel the setting of the detour route for the amount of TDM line transmission bandwidth that has been indicated by the mapping request from the line relaying device 1 and recover the amount of TDM line transmission bandwidth that has been mapped to the variable-transmission-speed device-connecting line 13 to the original state (Step ST48). As a result, the setting of the detour transfer route 42 for the TDM line in the line relaying device 2 as shown in FIG. 6 is completely cancelled to return to the previous state.

Hereinafter, as described in FIGS. 7 and 9, an example of the flow of detour route setting operation in the line relaying device 3 serving as the final destination when a mapping request is transmitted from the line relaying device 2 to the line relaying device 3 that is designated as the final destination of the mapping request transmitted from the line relaying device 1 in order to make mapping control to map the amount of TDM line transmission bandwidth overflowing due to a decrease in the transmission bandwidth of the variable-transmission-speed device-connecting line 11 into the variable-transmission-speed device-connecting line 12 is described in detail with reference to the flowchart of FIG. 11.

Figure 11:
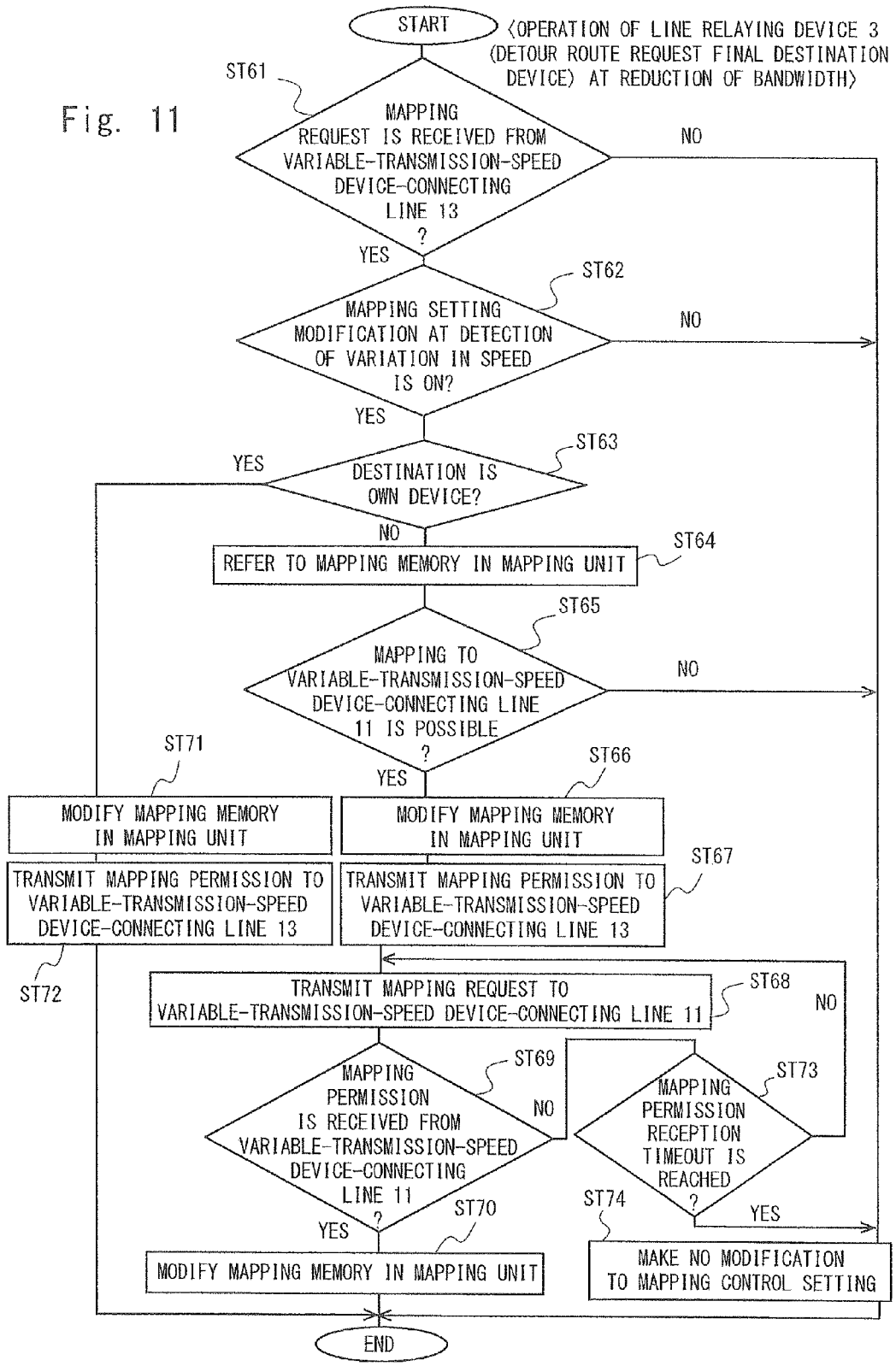
FIG. 11 is a flowchart to describe the flow of operation of a detour route request final destination device (line relaying device 3) at the time of detour control related to a TDM line in the network of FIG. 4.

FIG. 11 is a flowchart to describe the flow of operation of a detour route request final destination device (the line relaying device 3) at the time of detour control related to the TDM line in the network of FIG. 4, and it illustrates the flow when creating a detour route for TDM line data in the line relaying device 3 that has received the mapping request from the line relaying device 1 through the line relaying device 2, using as an example the case where the transmission bandwidth of the variable-transmission-speed device-connecting line 11 decreases and it becomes impossible to secure the whole TDM line transmission bandwidth.

In other words, it shows one example of the detour setting operation in the line relaying device 3 indicated by the destination address added as the final destination to the mapping request from the line relaying device 1 (which is a detour route request final destination device). In this exemplary embodiment, as shown in FIG. 9, the mapping request to which the address of the line relaying device 3 is added is transmitted to the line relaying device 3 that accommodates the TDM line as the final destination of the data of the TDM line accommodated in the line relaying device 1 through the line relaying device 2 serving as a detour destination for the data of the TDM line accommodated in the line relaying device 1.

In the flowchart of FIG. 11, the line relaying device 3 determines whether reception of the mapping request from the line relaying device 2 through the variable-transmission-speed device-connecting line 13 is detected in the device-connecting line termination unit 310 shown in FIG. 3 (Step ST61). When reception of the mapping request from the line relaying device 2 is not detected (NO in Step ST61), the process proceeds to Step ST74, and the detour control process ends without performing mapping control setting modification processing that makes mapping modification for changing the transfer route (Step ST74).

On the other hand, when reception of the mapping request from the line relaying device 2 is detected (YES in Step ST61), a notification indicating this is transmitted to the mapping request processing unit 308, and the mapping request processing unit 308 first determines whether a function of modifying mapping (mapping setting modification flag) is enabled (ON) or disabled (OFF) when the variation in the transmission speed of the variable-transmission-speed device-connecting line is detected (Step ST62).

When the function of modifying mapping is disabled (NO in Step ST62), the process proceeds to Step ST74, and the detour control process ends without performing mapping control setting modification processing (Step ST74).

On the other hand, when the function of modifying mapping is enabled (YES in Step ST62), the process proceeds to Step ST63, and it is checked whether the final destination address that is added to the received mapping request from the line relaying device 2 indicates the line relaying device 3 of its own by referring to unique device information of its own device that is stored in the unique device information storage unit 303 (Step ST63).

When the destination of the mapping request from the line relaying device 2 is its own device (YES in Step ST63), the process proceeds to Step ST71, and the mapping state of the variable-transmission-speed device-connecting line 13 connected to the line relaying device 3 is checked by reference to information of the mapping memory in the mapping unit 307, and the information of the mapping memory in the mapping unit 307 is modified so that the amount of TDM line transmission bandwidth added to the received mapping request is newly mapped and secured in the variable-transmission-speed device-connecting line 13 (Step ST71). After this, the mapping permission information indicating that the requested mapping is done is transmitted back to the line relaying device 2 from which the mapping request has been made through the variable-transmission-speed device-connecting line 13 (Step ST72), and the detour control process ends. As a result, the remaining detour route from the line relaying device 2 to the line relaying device 3 is created among the detour transfer route 42 shown in FIG. 6.

When the destination of the mapping request is its own device, the mapping request processing unit 308 of the line relaying device 3 ends the process without performing any processing related to detour control for the variable-transmission-speed device-connecting line 11 connected to the other device-connecting line termination unit 309 (the line to which the line relaying device 1 is connected as the opposite device). This is because it is not necessary to further transfer the mapping request from the line relaying device 2 since the address indicating the final destination of the mapping request from the line relaying device 2 indicates the line relaying device 3 of its own. Note that information about the address added to the mapping request may be any information as long as each line relaying device can uniquely distinguish its own device from other devices when the network is constructed, and a MAC address may be used, for example, as described above.

Further, when it is determined in Step ST63 that the destination of the received mapping request from the line relaying device 2 is not its own device (NO in Step ST63), the process proceeds to Step ST64, and the mapping state of the other variable-transmission-speed device-connecting line 11 connected to the line relaying device 3 is checked by reference to information of the mapping memory in the mapping unit 307 (Step ST64). Note that this exemplary embodiment is a case where the line relaying device 1 detects a decrease in the transmission speed of the variable-transmission-speed device-connecting line 11 and transmits a mapping request addressed to the line relaying device 3 as the final destination in order to set a detour route for TDM line data that has been transferred through the variable-transmission-speed device-connecting line 11, and the destination of the received mapping request from the line relaying device 2 is determined as its own device in Step ST63, and there is no case where the destination of the received mapping request from the line relaying device 2 is not determined as its own device (NO in Step ST53). However, in order to describe that each of the line relaying devices 1, 2 and 3 is set to the state capable of performing the same operation as a general rule, the instance in which there is a case where the destination of the received mapping request from the line relaying device 2 is not determined as its own device (NO in Step ST53) is described. Specifically, the case is described below where the final destination of the mapping request from the line relaying device 2 is not the line relaying device 3 but the line relaying device 1.

After this, it is determined whether the TDM line transmission bandwidth requested by the mapping request from the line relaying device 2 can be mapped to the variable-transmission-speed device-connecting line 11 as a detour route based on the result of checking the mapping state of the variable-transmission-speed device-connecting line 11 (Step ST65). In other words, it is checked whether the amount of TDM line transmission bandwidth specified by the mapping request from the line relaying device 2 can further detour along the variable-transmission-speed device-connecting line 11.

When it is determined that it is not possible to map the TDM line transmission bandwidth requested by the mapping request from the line relaying device 2 to the variable-transmission-speed device-connecting line 11 (NO in Step ST65), the process proceeds to Step ST74, and the detour control process ends without performing mapping control setting modification processing (Step ST74).

On the other hand, when it is determined that it is possible to map the TDM line transmission bandwidth to the variable-transmission-speed device-connecting line 11 (YES in Step ST65), because mapping of the amount of TDM line transmission bandwidth requested by the mapping request from the line relaying device 2 to the variable-transmission-speed device-connecting line 11 is possible as a detour route, the information of the mapping memory in the mapping unit 307 is modified so that the amount of TDM line transmission bandwidth requested by the mapping request from the line relaying device 2 is newly mapped into the variable-transmission-speed device-connecting line 11 (Step ST66).

After this, the mapping permission information indicating that the requested mapping is done is transmitted back to the line relaying device 2 from which the mapping request has been made through the variable-transmission-speed device-connecting line 13 (Step ST67). As a result, the detour route from the line relaying device 2 to the line relaying device 3 is created as the detour transfer route.

Further, the mapping request processing unit 308 of the line relaying device 3 transmits a mapping request, to which information indicating the amount of TDM line transmission bandwidth added to the mapping request from the line relaying device 2 is added, to the line relaying device 1 that is specified as the final destination of the mapping request from the line relaying device 2 through the variable-transmission-speed device-connecting line 11 (Step ST68).

The line relaying device 1 which is the opposite device to which the mapping request from the line relaying device 3 has been transmitted performs processing related to the mapping request from the line relaying device 3 and determines whether the mapping request can be met, and if it can be met, transmits mapping permission information to the line relaying device 3 from which the mapping request has been made through the variable-transmission-speed device-connecting line 11.

The line relaying device 3 from which the mapping request has been made determines whether the mapping permission information that is transmitted back from the line relaying device 1 which is the opposite device to which the request has been made through the variable-transmission-speed device-connecting line 11 is received (Step ST69). When the mapping permission information to be transmitted back from the line relaying device 1 which is the opposite device to which the request has been made is not yet received (NO in Step ST69), it is determined whether a predetermined timeout period has elapsed after transmitting the mapping request and thereby finds whether the mapping permission information reception timeout is reached (Step ST73). The timeout period is a period of time that is determined arbitrarily according to the transmission speed and the environment.

When the timeout period has not elapsed after transmitting the mapping request and the reception timeout is not reached (NO in Step ST73), the process returns to Step ST68 and repeats the operation of transmitting the mapping request to the line relaying device 1 which is the opposite device through the variable-transmission-speed device-connecting line 11. On the other hand, when the timeout period has elapsed after transmitting the mapping request and the reception timeout is reached (YES in Step ST73), it is considered that the line relaying device 1 is not ready to carry out the mapping for the detour route, and the process proceeds to Step ST74, and the detour control process ends without performing mapping control setting modification processing (Step ST74). Note that, in this case, the state of the mapping memory in the mapping unit 307 may be restored to the state before the modification in Step ST66 to be set to the state where detour control cannot be made in the line relaying device 3 as well, and a notification that detour control becomes impossible may be transmitted to the line relaying device 2.

On the other hand, when the mapping permission information transmitted back from the line relaying device 1 which is the opposite device to which the request has been made is received in Step ST69 (YES in Step ST69), because both the line relaying device 3 and the line relaying device 1 can map the amount of TDM line transmission bandwidth requested by the mapping request to the variable-transmission-speed device-connecting line 11, the information of the mapping memory in the mapping unit 307 is modified so that the amount of TDM line transmission bandwidth requested by the mapping request is newly mapped into the variable-transmission-speed device-connecting line 11 (Step ST70). As a result, the detour route of the variable-transmission-speed device-connecting line 13, the line relaying device 3 and the variable-transmission-speed device-connecting line 11 is created as the detour transfer route for the TDM line data.

Hereinafter, as described in FIGS. 8 and 10, an example of the flow of the detour route setting operation in the line relaying device 3 as the final destination when a mapping cancellation request is transmitted from the line relaying device 2 to the line relaying device 3 that is designated as the final destination of the mapping cancellation request indicating cancellation of setting of the detour route as a result that it has returned from the state of performing control for mapping the amount of TDM line transmission bandwidth requested by the mapping request from the line relaying device 1 (which is the amount of TDM line transmission bandwidth overflowing due to a decrease in the transmission speed of the variable-transmission-speed device-connecting line 11) into the variable-transmission-speed device-connecting lines 12 and 13 to the state of being able to map the whole of the TDM line transmission bandwidth into the transmission bandwidth of the variable-transmission-speed device-connecting line 11 by the recovery of the transmission bandwidth of the variable-transmission-speed device-connecting line 11 is described in detail with reference to the flowchart of FIG. 12.

Figure 12:
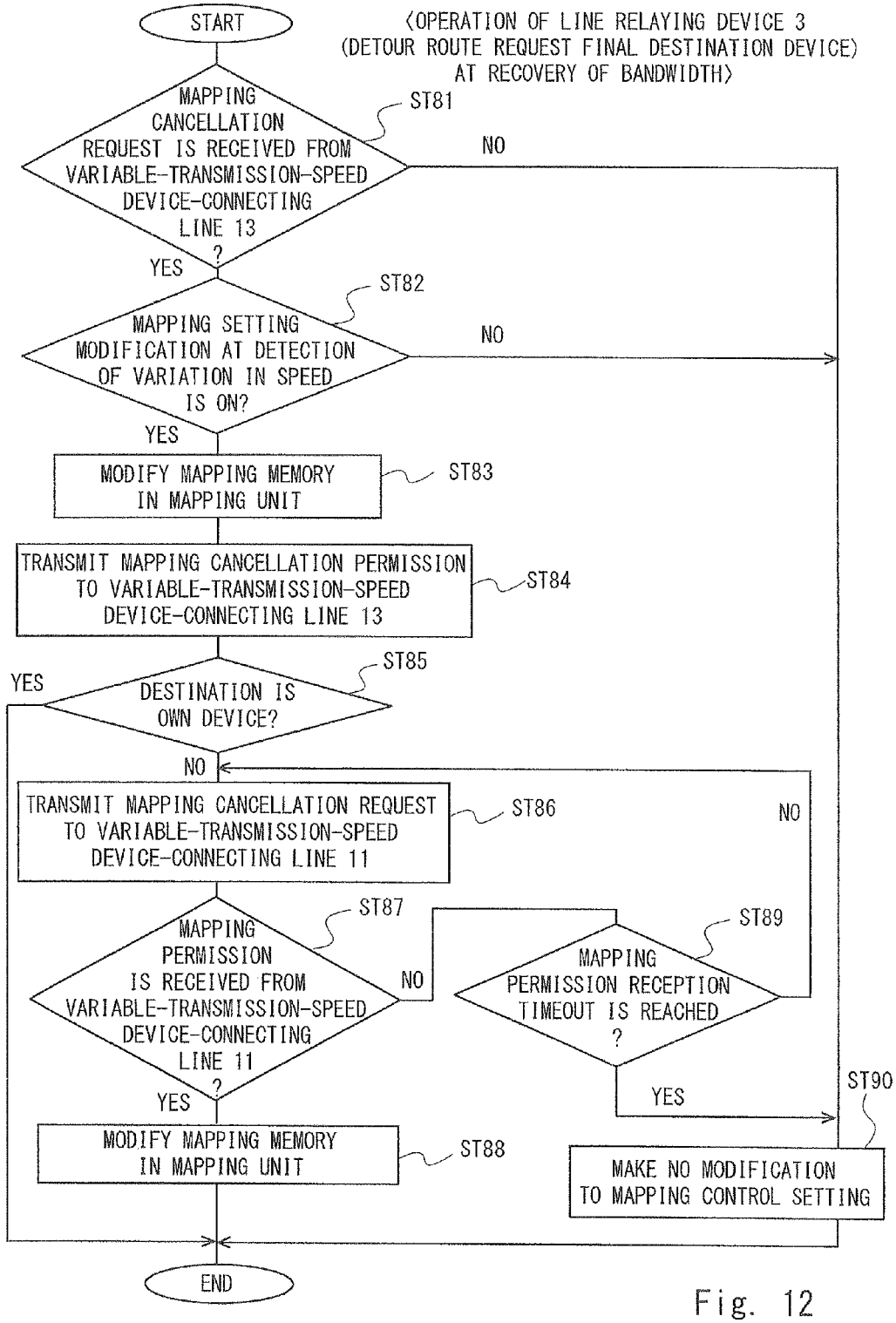
FIG. 12 is a flowchart to describe the flow of operation of a detour route request final destination device (line relaying device 3) at the time of detour recovery control related to a TDM line in the network of FIG. 4.

FIG. 12 is a flowchart to describe the flow of operation of a detour route request final destination device (the relay device 3) at the time of detour recovery control related to the TDM line in the network of FIG. 4, and it shows an example of the detour recovery operation in the line relaying device 3 (which is a detour route request final destination device) indicated by the address added as the final destination to the mapping cancellation request from the line relaying device 1, using as an example the case where the transmission bandwidth of the variable-transmission-speed device-connecting line 11 that has been reduced recovers to the previous bandwidth and becomes ready to secure the whole TDM line transmission bandwidth.

In other words, FIG. 12 shows one example of the detour recovery operation in the line relaying device 3 (which is a detour route request final destination device) indicated by the address added as the final destination to the mapping cancellation request from the line relaying device 1. In this exemplary embodiment, as shown in FIG. 10, the mapping cancellation request to which the address of the line relaying device 3 is added is transmitted to the line relaying device 3 that accommodates the TDM line as the final destination of the data of the TDM line accommodated in the line relaying device 1 through the line relaying device 2 serving as a detour destination for the data of the TDM line accommodated in the line relaying device 1.

In the flowchart of FIG. 12, the line relaying device 3 determines whether reception of the mapping cancellation request from the line relaying device 2 through the variable-transmission-speed device-connecting line 13 is detected in the device-connecting line termination unit 310 shown in FIG. 3 (Step ST81). When reception of the mapping cancellation request from the line relaying device 2 is not detected (NO in Step ST81), the process proceeds to Step ST90, and the detour control process ends without performing mapping control setting modification processing that makes a mapping modification for changing the transfer route (Step ST90).

On the other hand, when reception of the mapping cancellation request from the line relaying device 2 is detected (YES in Step ST81), a notification indicating this is transmitted to the mapping request processing unit 308, and the mapping request processing unit 308 first determines whether a function of modifying mapping (mapping setting modification flag) is enabled (ON) or disabled (OFF) when the variation in the transmission speed of the variable-transmission-speed device-connecting line is detected (Step ST82).

When the function of modifying mapping is disabled (NO in Step ST82), the process proceeds to Step ST90, and the detour control process ends without performing mapping control setting modification processing (Step ST90).

On the other hand, when the function of modifying mapping is enabled (YES in Step ST82), the process proceeds to Step ST43, and the information of the mapping memory in the mapping unit 307 is modified for re-mapping so as to cancel the setting of the detour route and recover the amount of the TDM line transmission bandwidth that has been mapped to the variable-transmission-speed device-connecting line 13 to the original state (Step ST83).

After that, mapping cancellation permission information indicating that the requested mapping cancellation is done is transmitted to the line relaying device 2 from which the mapping cancellation request has been made through the variable-transmission-speed device-connecting line 13 (Step ST84). As a result, the detour route from the line relaying device 2 to the line relaying device 3 in the detour transfer route 42 shown in FIG. 6 is cancelled.

Further, the mapping request processing unit 308 of the line relaying device 3 checks whether the final destination address that is added to the received mapping cancellation request from the line relaying device 2 is the line relaying device 3 of its own by referring to the unique device information of its own device stored in the unique device information storage unit 303 (Step ST85).

When the destination of the mapping cancellation request received from the line relaying device 2 is its own device (YES in Step ST85), the detour control process ends because the address indicating the final destination of the mapping cancellation request from the line relaying device 2 indicates the line relaying device 3 of its own and therefore it is not necessary to further transfer the mapping cancellation request from the line relaying device 2 to the variable-transmission-speed device-connecting line 11 connected to the other device-connecting line termination unit 309 (the line to which the line relaying device 1 is connected as the opposite device). Note that information about the address added to the mapping request may be any information as long as each line relaying device can uniquely distinguish its own device from other devices when the network is constructed, and a MAC address may be used, for example, as described above.

On the other hand, when it is determined that the destination of the mapping cancellation request from the line relaying device 2 is not its own device (NO in Step ST85), the mapping request processing unit 308 of the line relaying device 3 transmits the mapping cancellation request, to which information indicating the amount of TDM line transmission bandwidth added to the mapping cancellation request from the line relaying device 2 is added, to the line relaying device 1 that is designated as the final destination of the mapping cancellation request from the line relaying device 2 through the variable-transmission-speed device-connecting line 11

(Step ST86). Note that this exemplary embodiment is a case where the line relaying device 1 detects recovery in the transmission speed of the variable-transmission-speed device-connecting line 11 which has been reduced and transmits a mapping cancellation request addressed to the line relaying device 3 as the final destination in order to cancel the detour route that has been set as a detour route for TDM line data that has been transferred through the variable-transmission-speed device-connecting line 11, and the destination of the received mapping cancellation request from the line relaying device 2 is determined as its own device in Step ST85, and there is no case where the destination of the received mapping cancellation request from the line relaying device 2 is not determined as its own device (NO in Step ST85). However, in order to describe that each of the line relaying devices 1, 2 and 3 is set to the state capable of performing the same operation as a general rule, the instance in which there is a case where the destination of the received mapping cancellation request from the line relaying device 2 is not determined as its own device (NO in Step ST85) is described. Specifically, the case is described below where the final destination of the mapping cancellation request from the line relaying device 2 is not the line relaying device 3 but the line relaying device 1.

The line relaying device 1 which is the opposite device to which the mapping cancellation request has been transmitted from the line relaying device 3 performs processing related to the mapping cancellation request from the line relaying device 3 and determines whether the mapping cancellation request can be met, and if it can be met, transmits mapping cancellation permission information to the line relaying device 3 from which the mapping cancellation request has been made through the variable-transmission-speed device-connecting line 11.

The line relaying device 3 from which the mapping cancellation request has been made determines whether the mapping cancellation permission information that is transmitted back from the line relaying device 1 which is the opposite device to which the request has been made through the variable-transmission-speed device-connecting line 11 is received (Step ST87). When the mapping cancellation permission information transmitted back from the line relaying device 1 which is the opposite device to which the request has been made is not yet received (NO in Step ST87), it is determined whether a predetermined timeout period has elapsed after transmitting the mapping cancellation request and thereby finds whether the mapping cancellation permission information reception timeout is reached (Step ST89). The timeout period is a period of time that is determined arbitrarily according to the transmission speed and the environment.

When the timeout period has not elapsed after transmitting the mapping cancellation request and the reception timeout is not reached (NO in Step ST89), the process returns to Step ST86 and repeats the operation of transmitting the mapping cancellation request to the line relaying device 1 which is the opposite device through the variable-transmission-speed device-connecting line 11. On the other hand, when the timeout period has elapsed after transmitting the mapping cancellation request and the reception timeout is reached (YES in Step ST89), it is considered that the line relaying device 1 is not ready to cancel the mapping state that has been set for the detour route, and the process proceeds to Step ST90, and the detour control process ends without performing mapping control setting modification processing (Step ST90). Note that, in this case, the state of the mapping memory in the mapping unit 307 may return to the state at the time of detour route setting, and a notification indicating not to cancel the setting of the detour route may be transmitted to the line relaying device 2, so that detour control from the line relaying device 2 to the line relaying device 1 is continuously made in the line relaying device 3 as well.

On the other hand, when the mapping cancellation permission information transmitted back from the line relaying device 1 which is the opposite device to which the request has been made is received in Step ST87 (YES in Step ST87), both the line relaying device 3 and the line relaying device 1 are ready to cancel the mapping related to the detour transfer route that has been used, which are ready to recover to the original state where the amount of TDM line transmission bandwidth that has been mapped to the variable-transmission-speed device-connecting line 11 by the mapping request from the line relaying device 2 can be mapped back.

Accordingly, the information of the mapping memory in the mapping unit 307 is modified for re-mapping so as to cancel the setting of the detour route for the amount of TDM line transmission bandwidth that has been indicated by the mapping request from the line relaying device 2 and recover the amount of TDM line transmission bandwidth that has been mapped to the variable-transmission-speed device-connecting line 11 to the original state (Step ST88). As a result, the setting of the TDM line detour transfer route in the line relaying device 3 is completely cancelled to return to the previous state.

It should be noted that, although an example in which one line relaying device 2 serves to create a detour route between the line relaying device 1 and the line relaying device 3 respectively accommodating the TDM lines is shown in the ring network configuration diagram in FIG. 4, it is not limited thereto, and any number of line relaying devices corresponding to the line relaying device 2 may be connected to the ring network, and the number of devices constituting the ring network is not limited. It is obvious that, when the transmission speed of the variable-transmission-speed device-connecting line that is preset as a transfer route for TDM line data has changed, each line relaying device corresponding to the line relaying device 2 performs the above-described operation and can thereby create a detour route for the accommodated TDM line and further cancel the setting of the created detour route in the ring network.

Further, it is easily understandable from the detailed description above that a detour route can be created and cancelled automatically without a need for a network administrator to perform processing to modify the network configuration according to the variation in the transmission speed of the variable-transmission-speed device-connecting line, and the network with sufficient redundancy to the TDM line can be implemented.

It is also obvious that, when a transfer route for TDM line data that has been set becomes unavailable due to the event such as maintenance or failure of network equipment, other than the variation in the transmission speed of the variable-transmission-speed device-connecting line, it is possible to automatically update the setting of the mapping memory in each of the line relaying devices constituting the ring network and create a detour route.

(Description of Advantageous Effects of Exemplary Embodiment)

As described above in detail, the following exemplary advantageous effects can be obtained in this exemplary embodiment.

A first exemplary advantageous effect is that, when the transmission bandwidth of the variable-transmission-speed device-connecting line that connects the line relaying devices varies, a detour route for the overflow amount of TDM line transmission bandwidth can be automatically created using the ring architecture, and it is thus possible to reliably prevent the TDM line data from being discarded and thereby provide a service having redundancy for the TDM transmission bandwidth.

A second exemplary advantageous effect is that, when the transmission bandwidth of the variable-transmission-speed device-connecting line returns to the original state after automatically creating a detour route for the overflow amount of TDM line transmission bandwidth caused by the variation in the transmission bandwidth of the variable-transmission-speed device-connecting line that connects the line relaying devices, the transfer route for the TDM line data is automatically recovered to the previous state, and therefore it is not necessary for a network administrator to optimize the network setting each time the transmission speed of the variable-transmission-speed device-connecting line varies.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2011-264713, filed on Dec. 2, 2011, the disclosure of which is incorporated herein in its entirety by reference.

REFERENCE SIGNS LIST

1 LINE RELAYING DEVICE
2 LINE RELAYING DEVICE
3 LINE RELAYING DEVICE
11 VARIABLE-TRANSMISSION-SPEED DEVICE-CONNECTING LINE
12 VARIABLE-TRANSMISSION-SPEED DEVICE-CONNECTING LINE
13 VARIABLE-TRANSMISSION-SPEED DEVICE-CONNECTING LINE
21 TDM TERMINATION DEVICE
33 TDM TERMINATION DEVICE
31 L2 SWITCH
32 L2 SWITCH
33 L2 SWITCH
41 TRANSFER ROUTE
42 DETOUR TRANSFER ROUTE
101 TDM LINE TERMINATION UNIT
102 ETHERNET LINE TERMINATION UNIT
103 UNIQUE DEVICE INFORMATION STORAGE UNIT
104 STP PROCESSING UNIT
105 MUX/DEMUX
106 DEVICE-CONNECTING LINE AGGREGATION/DISTRIBUTION UNIT
107 MAPPING UNIT
108 MAPPING REQUEST PROCESSING UNIT
109 DEVICE-CONNECTING LINE TERMINATION UNIT
110 DEVICE-CONNECTING LINE TERMINATION UNIT
201 TDM LINE TERMINATION UNIT
202 ETHERNET LINE TERMINATION UNIT
203 UNIQUE DEVICE INFORMATION STORAGE UNIT
204 STP PROCESSING UNIT
205 MUX/DEMUX
206 DEVICE-CONNECTING LINE AGGREGATION/DISTRIBUTION UNIT
207 MAPPING UNIT
208 MAPPING REQUEST PROCESSING UNIT
209 DEVICE-CONNECTING LINE TERMINATION UNIT
210 DEVICE-CONNECTING LINE TERMINATION UNIT
301 TDM LINE TERMINATION UNIT
302 ETHERNET LINE TERMINATION UNIT
303 UNIQUE DEVICE INFORMATION STORAGE UNIT
304 STP PROCESSING UNIT
305 MUX/DEMUX
306 DEVICE-CONNECTING LINE AGGREGATION/DISTRIBUTION UNIT
307 MAPPING UNIT
308 MAPPING REQUEST PROCESSING UNIT
309 DEVICE-CONNECTING LINE TERMINATION UNIT
310 DEVICE-CONNECTING LINE TERMINATION UNIT

The invention claimed is:

1. A line relaying device for relaying transmission of data through a communication line, the device constituting a ring network where the line relaying device and an opposite device are connected in a ring by a variable-transmission-speed device-connecting line where a transmission speed varies,
wherein, when detecting reduction of a transmission bandwidth that is capable of transmission caused by variation in a transmission speed of the variable-transmission-speed device-connecting line preset as a Time Division Multiplexing (TDM) line transfer route, the line relaying device creates a TDM line detour route allowing an amount of TDM line transmission bandwidth overflowing from the variable-transmission-speed device-connecting line to transfer by a detour via another line relaying device connected in a ring according to a degree of variation in the transmission speed, and thereby a redundancy network to the TDM line is implemented,
wherein, when canceling setting of the created TDM line detour route, the line relaying device cancels setting of the detour route to a line relaying device as a final transfer destination, and
wherein the line relaying device cancels the setting of the detour route to the line relaying device as the final transfer destination by transmitting a mapping cancellation request with information indicating the amount of TDM line transmission bandwidth overflowing from the variable-transmission-speed device-connecting line and a destination address indicating the line relaying device as the final transfer destination of TDM line data to another line relaying device connected in a ring.

2. The line relaying device according to claim 1, wherein, when creating a TDM line detour route, the line relaying device creates the TDM line detour route to a line relaying device as a final transfer destination by transmitting a mapping request with information indicating the amount of TDM line transmission bandwidth overflowing from the variable-transmission-speed device-connecting line and a destination address indicating the line relaying device as the final transfer destination of TDM line data to another line relaying device connected in a ring and thereby mapping an overflow amount of TDM line transmission bandwidth added to the mapping request to each variable-transmission-speed device-connecting line sequentially from said another line relaying device to the line relaying device as the final transfer destination.

3. The line relaying device according to claim 1, wherein, when detecting recovery of a transmission bandwidth that is capable of transmission to an original state caused by variation in a transmission speed of the variable-transmission-speed device-connecting line preset as a TDM line transfer route, the line relaying device cancels setting of the created TDM line detour route to return to a state of transferring TDM line data through the preset TDM line transfer route.

4. The line relaying device according to claim 3, wherein, when canceling the setting of the created TDM line detour route, the line relaying device re-maps the overflow amount of TDM line transmission bandwidth added to the mapping cancellation request to an original state among the transmission bandwidth mapped to each variable-transmission-speed device-connecting line sequentially from said another line relaying device to the line relaying device as the final transfer destination.

5. The line relaying device according to claim 1, wherein only the amount of TDM line transmission bandwidth overflowing is transferred by the detour.

6. The line relaying device according to claim 1, wherein the line relaying device re-maps the overflow amount of TDM line transmission bandwidth added to the mapping cancellation request to an original state among the transmission bandwidth mapped to each variable-transmission-speed device-connecting line sequentially from said another line relaying device to the line relaying device as the final transfer destination.

7. A TDM line detour system for setting and canceling a TDM line detour route using a ring network which is configured so that line relaying devices for relaying transmission of data through a communication line are connected in a ring by a variable-transmission-speed device-connecting line where a transmission speed varies,
wherein each of the line relaying devices is configured as the line relaying device according to claim 1.

8. A TDM line detour control method for setting and canceling a Time Division Multiplexing (TDM) line detour route using a ring network which is configured so that line relaying devices for relaying transmission of data through a communication line are connected in a ring by a variable-transmission-speed device-connecting line where a transmission speed varies,
wherein, when detecting reduction of a transmission bandwidth that is capable of transmission caused by variation in a transmission speed of the variable-transmission-speed device-connecting line preset as a TDM line transfer route, any one of the line relaying devices creates a TDM line detour route allowing an amount of TDM line transmission bandwidth overflowing from the variable-transmission-speed device-connecting line to transfer by a detour via another line relaying device connected in a ring according to a degree of variation in the transmission speed, and thereby a redundancy network to the TDM line is implemented,
wherein, when canceling setting of the created TDM line detour route, the method cancels setting of the detour route to a line relaying device as a final transfer destination, and
wherein the method cancels the setting of the detour route to the line relaying device as the final transfer destination by transmitting a mapping cancellation request with information indicating the amount of TDM line transmission bandwidth overflowing from the variable-transmission-speed device-connecting line and a destination address indicating the line relaying device as the final transfer destination of TDM line data to another line relaying device connected in a ring.

9. The TDM line detour control method according to claim 8, wherein, when creating a TDM line detour route, the method creates the TDM line detour route to a line relaying device as a final transfer destination by transmitting a mapping request with information indicating the amount of TDM line transmission bandwidth overflowing from the variable-transmission-speed device-connecting line and a destination address indicating the line relaying device as the final transfer destination of TDM line data to another line relaying device connected in a ring and thereby mapping an overflow amount of TDM line transmission bandwidth added to the mapping request to each variable-transmission-speed device-connecting line sequentially from said another line relaying device to the line relaying device as the final transfer destination.

10. The TDM line detour control method according to claim 8, wherein, when detecting recovery of a transmission bandwidth that is capable of transmission to an original state caused by variation in a transmission speed of the variable-transmission-speed device-connecting line preset as a TDM line transfer route, the method cancels setting of the created TDM line detour route to return to a state of transferring TDM line data through the preset TDM line transfer route.

11. A TDM line detour control method for setting and canceling a Time Division Multiplexing (TDM) line detour route using a ring network which is configured so that line relaying devices for relaying transmission of data through a communication line are connected in a ring by a variable-transmission-speed device-connecting line where a transmission speed varies,
wherein, when detecting reduction of a transmission bandwidth that is capable of transmission caused by variation in a transmission speed of the variable-transmission-speed device-connecting line preset as a TDM line transfer route, any one of the line relaying devices creates a TDM line detour route allowing an amount of TDM line transmission bandwidth overflowing from the variable-transmission-speed device-connecting line to transfer by a detour via another line relaying device connected in a ring according to a degree of variation in the transmission speed, and thereby a redundancy network to the TDM line is implemented,
wherein, when detecting recovery of a transmission bandwidth that is capable of transmission to an original state caused by variation in a transmission speed of the variable-transmission-speed device-connecting line preset as a TDM line transfer route, the method cancels setting of the created TDM line detour route to return to a state of transferring TDM line data through the preset TDM line transfer route, and
wherein, when canceling setting of the created TDM line detour route, the method cancels setting of the detour route to a line relaying device as a final transfer destination by transmitting a mapping cancellation request with information indicating the amount of TDM line transmission bandwidth overflowing from the variable-transmission-speed device-connecting line and a destination address indicating the line relaying device as the final transfer destination of TDM line data to another line relaying device connected in a ring and thereby re-mapping the overflow amount of TDM line transmission bandwidth added to the mapping cancellation request to an original state among a transmission bandwidth mapped to each variable-transmission-speed device-connecting line sequentially from said another line relaying device to the line relaying device as the final transfer destination.

12. The TDM line detour control method according to claim 8, wherein the method re-maps the overflow amount of TDM line transmission bandwidth added to the mapping cancellation request to an original state among a transmission bandwidth mapped to each variable-transmission-speed device-connecting line sequentially from said another line relaying device to the line relaying device as the final transfer destination.

13. The TDM line detour control method according to claim 8, wherein only the amount of TDM line transmission bandwidth overflowing is transferred by the detour.

\* \* \* \* \*